US011508490B2

(12) United States Patent
Crichlow

(10) Patent No.: US 11,508,490 B2
(45) Date of Patent: Nov. 22, 2022

(54) MANAGING VOLATILES IN NUCLEAR WASTE VITRIFICATION

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 29 days.

(21) Appl. No.: 17/159,819

(22) Filed: Jan. 27, 2021

(65) Prior Publication Data

US 2021/0287821 A1 Sep. 16, 2021

Related U.S. Application Data

(63) Continuation-in-part of application No. 16/815,402, filed on Mar. 11, 2020, now Pat. No. 11,085,270.

(60) Provisional application No. 63/064,183, filed on Aug. 11, 2020.

(51) Int. Cl.
G21F 9/34 (2006.01)
G21F 9/30 (2006.01)
B01J 20/02 (2006.01)
B01J 20/04 (2006.01)
B01J 20/06 (2006.01)
B01J 20/12 (2006.01)

(52) U.S. Cl.
CPC .......... *G21F 9/305* (2013.01); *B01J 20/0233* (2013.01); *B01J 20/0288* (2013.01); *B01J 20/0296* (2013.01); *B01J 20/041* (2013.01); *B01J 20/043* (2013.01); *B01J 20/06* (2013.01); *B01J 20/12* (2013.01)

(58) Field of Classification Search
CPC ... G21F 9/305; B01J 20/0233; B01J 20/0288; B01J 20/0296; B01J 20/041; B01J 20/043; B01J 20/06; B01J 20/12
See application file for complete search history.

(56) References Cited

U.S. PATENT DOCUMENTS

| 5,100,259 A | 3/1992 | Buelt | |
|---|---|---|---|
| 5,340,372 A * | 8/1994 | Macedo | B09B 3/29 65/133 |
| 6,620,092 B2 * | 9/2003 | Albus | B09C 1/067 588/256 |
| 7,078,528 B2 | 7/2006 | Allen | |

(Continued)

FOREIGN PATENT DOCUMENTS

| EP | 3045223 A1 | 7/2016 | |
|---|---|---|---|
| WO | WO-2007134159 A2 * | 11/2007 | .............. B01J 19/12 |

*Primary Examiner* — Janine M Kreck

(74) *Attorney, Agent, or Firm* — Eric Kelly

(57) ABSTRACT

Dangerous, toxic, and/or radioactive volatiles are produced from nuclear fission, nuclear decay, and/or as a byproduct from vitrification of radioactive wastes. Such volatiles are treated during and after vitrification of the radioactive waste, to be converted into fixed-chemicals, that are retained in, on, and/or proximate to a cold-cap located vertically above vitrified melt. The cold-cap may have one or more volatile fixing additives (VFAs) for retaining the fixed-chemicals. The VFAs are located in and/or the cold-cap. The vitrification may occur within at least one human-made cavern. The human-made cavern may be located within a deep geologic rock formation. The deep geologic rock formation may be located at least 2,000 feet below a terrestrial surface of the Earth. The human-made cavern may be formed by first drilling a wellbore from the terrestrial surface to the deep geologic rock formation and then underreaming the wellbore into the deep geologic rock formation.

23 Claims, 22 Drawing Sheets

(56) References Cited

U.S. PATENT DOCUMENTS

| | | |
|---|---|---|
| 7,256,052 B2 | 8/2007 | Coute |
| 7,822,583 B2 | 10/2010 | Liu |
| 7,824,614 B2 | 11/2010 | Tanaami |
| 7,846,325 B2 | 12/2010 | Van Hardeveld |
| 8,530,718 B2 | 9/2013 | Yamazaki |
| 8,574,523 B2 | 11/2013 | Collins |
| 8,951,182 B2 | 2/2015 | Yamazaki |
| 9,188,253 B2 | 11/2015 | Sawamura |
| 9,245,655 B2 | 1/2016 | Pegg |
| 9,981,295 B2 | 5/2018 | Lalacencette |
| 10,265,671 B2 | 4/2019 | Bucci |
| 10,290,384 B2 | 5/2019 | Campbell |
| 10,446,286 B2 | 10/2019 | Pegg |
| 10,807,132 B2 | 10/2020 | Crichlow |
| 2008/0021179 A1 | 1/2008 | Mui |
| 2013/0125564 A1 | 5/2013 | Booth |
| 2019/0295734 A1 | 9/2019 | Cohn |

\* cited by examiner

NOT TO SCALE $3I_2(g) + 6AgNO_3(s) \rightarrow 4AgI(s) + 2AgIO_3(s) + 6NO_2$      (Eq. 1)

3 mol     6 mol       4 mol      2 mol     6 mol 760.5 g    1019.22 g    939.08 g    65.54 g    276 g $CH_3I(g) + AgNO_3(s) \rightarrow CH_3NO_3(g) + AgI(s)$      (Eq. 2)

1 mol      1 mol       1 mol       1 mol 141.94 g    169.87 g    77.04 g     234.77 g $I_2(g) + 2Ag(s) \rightarrow 2AgI(s)$      (Eq. 3)

1 mol      2 mol      2 mol 253.81 g   215.74 g    469.55 g $2CH_3I(g) + 2H_2O(g) + 2Ag(s) \rightarrow 2AgI(s) + 2CH_3OH(g) + H_2(g)$      (Eq. 4)

2 mol       2 mol       2 mol       2 mol       2 mol      1 mol 283.88 g     36 g     215.74 g    469.55 g    64.08 g    2 g $Cs_2O + Al_2O_3 \cdot 2SiO_2 \rightarrow 2CsAlSiO_4(s)$      (Eq. 5)

1 mol      1 mol        2 mol 281.81 g   222.13 g     503.94 g

FIG. 7

$$Cs_2O + Al_2O_3 \cdot 4SiO_2 \rightarrow 2CsAlSi_2O_6 \text{ (s)} \quad \text{(Eq. 6)}$$

1 mol    1 mol           2 mol 281.81 g  342 g          624.11 g $$Cs_2O + Al_2O_3 \cdot 10SiO_2 \rightarrow 2CsAlSi_5O_{12} \text{ (s)} \quad \text{(Eq. 7)}$$

1 mol    1 mol           2 mol 281.81 g  702.8 g         984.61 g $$Cs_2SiO_3 \text{ (amorphous)} + O_2 \text{ (g)} \rightarrow Cs_2O \text{ (g)} + SiO_2 \text{ (amorphous)} + O_2 \text{ (g)} \quad \text{(Eq. 8)}$$

$$Cs_2O \text{ (g)} + Al_2O_2 \cdot 4SiO_2 \text{ (s)} \rightarrow 2CsAlSi_2O_2 \text{ (s)} \quad \text{(Eq. 9)}$$

1 mol    1 mol           2 mol 281.81 g  326.3 g         496.11 g $$2CsI + 1/2\, O_2 \text{ (g)} \rightarrow Cs_2O \text{ (g)} + I_2 \text{ (g)} \quad \text{(Eq. 10)}$$

$$Cs_2O \text{ (g)} + Al_2O_3 \cdot 4SiO_2 \text{ (s)} \rightarrow 2CsAlSi_2O_6 \text{ (s)} \quad \text{(Eq. 11)}$$

1 mol    1 mol           2 mol 281.81 g  342 g          624.11 g

FIG. 8

$2CsOH + O_2 (g) \rightarrow Cs_2O (g) + H_2O (g) + O_2 (g)$ (Eq. 12)

$Cs_2O (g) + Al_2O_2 \cdot 4SiO_2 (s) \rightarrow 2CsAlSi_2O_2 (s)$ (Eq. 13)

1 mol     1 mol     2 mol 281.81 g    326.3 g    496.11 g $2NaOH + CO_2 \rightarrow Na_2CO_3 + H_2O$ (Eq. 14)

2 mol    1 mol    1 mol    1 mol 80 g     44 g     106 g     18 g $^{14}CO_2 + 2Mg \rightarrow 2MgO + {}^{14}C$ (Eq. 15)

1 mol    2 mol    2 mol    1 mol 44 g     48 g     80 g     12 g $Ca(OH)_2 + CO_2 \rightarrow CaCO_3 + H_2O$ (Eq. 16)

1 mol    1 mol    1 mol    1 mol 74 g     44 g     100 g     18 g

FIG. 9

$2NaOH + CO_2 \rightarrow Na_2CO_3 + H_2O$ (Eq. 17)

2 mol    1 mol    1 mol    1 mol 40 g    44 g    106 g    18 g $Na_2CO_3 + Ca(OH)_2 \rightarrow 2NaOH + CaCO_3$ (Eq. 18)

1 mol    1 mol    2 mol    1 mol $T_2 + \tfrac{1}{2} O_2 \rightarrow T_2O$ (Eq. 19)

$T_2 + H_2O \rightarrow HTO + HT$ (Eq. 20)

$H_xMn_2O_4 + yT^+ \rightarrow H_{x-y}T_yMn_2O_4 + yH^+$ (Eq. 21)

$H_xMn_2O_4 + yOT^- \rightarrow H_{x-y}T_yMn_2O_4 + yH^+ + y(2e^-) + y(1/2O_2)$ (Eq. 22)

$Li_xMn_2O_4 + y\,T^+ \rightarrow H_{x-y}T_yMn_2O_4 + y\,Li^+$ (Eq. 23)

$CaO + Tc_2O_7 \rightarrow Ca(TcO_4)_2$ (Eq. 24)

1 mol    1 mol    1 mol 56 g    308 g    364.07 g

FIG. 10

$$BaO + Tc_2O_7 \rightarrow Ba(TcO_4)_2 \qquad (Eq.\ 25)$$

1 mol    1 mol     1 mol 153.33 g   308 g     461.32 g $$3BaO + Tc_2O_7 \rightarrow Ba_3(TcO_5)_2 \qquad (Eq.\ 26)$$

3 mol    1 mol     1 mol 460 g     308 g     767.98 g $$SrO + Tc_2O_7 \rightarrow Sr(TcO_4)_2 \qquad (Eq.\ 27)$$

1 mol    1 mol     1 mol 103.62 g   308 g     411.62 g $$CdO + Al_2Si_2O_5(OH)_4 \rightarrow CdOAl_2O_3.2SiO_2 + 2H_2O \qquad (Eq.\ 28)$$

1 mol     1 mol            1 mol           2 mol 128.41 g    258.16 g       350.37 g      36 g $$2CdO + 2Al_2Si_2O_5(OH)_4 \rightarrow 2CdOAl_2O_3.2SiO_2 + 4H_2O \qquad (Eq.\ 29)$$

2 mol     2 mol            2 mol           4 mol 256.82 g    516.32 g       700.74 g      72 g

FIG. 11

$MoO_3 + Na_2CO_3 \rightarrow Na_2MoO_4 + CO_2$ (Eq. 30)

1 mol    1 mol      1 mol       1 mol 143.94 g   106 g      205.9 g     44 g $MoO_3 + SnO_2 \rightarrow MoO_3{:}SnO_2$    (thin film) (Eq. 31)

1 mol    1 mol     1 mol 143.94 g   150.7 g   294.64 g $MoO_3 + CaO \rightarrow CaMoO_4$      (calcium absorber) (Eq. 32)

1 mol    1 mol     1 mol 143.94 g   56 g     500 gr $2MoO_3 + 2Al_2O_3 \cdot 4SiO_2 \rightarrow 2MoAlSi_2O_6$ (Eq. 33)

$2SbH_3 + 6Ag \rightarrow 2Ag_3Sb + 3H_2$ (Eq. 34)

2 mol    6 mol     2 mol      3 mol 249.56 g   647.22 g   890.73 g   6 g

FIG. 12

SbH₃ + 3AgCl → Sb + 3Ag + 3HCl  (Eq. 35)

1 mol    3 mol    1 mol   3 mol    3 mol 124.78 g   429.96 g   121.76 g   323.61 g   109.5 g SbH₃ + 3AgI → Sb + 3Ag + 3HI  (Eq. 36)

1 mol    3 mol    1 mol   3 mol    3 mol 124.78 g   704.3 g   121.76 g   232.61 g   109.5 g 2(CH₃)₃Sb + O₂ → 2(CH₃)₃SbO  (Eq. 37)

2 mol         1 mol       2 mol 333.52 g      32 g        349.52 g

2SbH₃ + 3O₂ → Sb₂O₃ + 3H₂O  (Eq. 38)

2 mol    3 mol    1 mol    3 mol 124.78 g   96 g    291.5 g   54 g

Sb₂O₅ + CaO → CaSb₂O₆     (calcium material absorber)  (Eq. 39)

1 mol    1 mol    1 mol 323.52 g   56 g    379.6 g

FIG. 13

$Sb_2O_5 + CaO \rightarrow CaSb_2O_7$  (Eq. 40)

$H_2Se + 2Ag \rightarrow Ag_2Se + H_2$  (Eq. 41)
1 mol   2 mol   1 mol   1 mol
80.98 g   215.74 g   294.7 g   2 g $H_2Se + 2Ag(OH) \rightarrow 2 H_2O + Ag_2Se$  (Eq. 42)
1 mol   2 mol   2 mol   1 mol
80.98 g   249.76 g   36 g   294.7 g $H_2Te + 2Ag \rightarrow Ag_2Te + H_2$  (Eq. 43)
1 mol   2 mol   1 mol   1 mol
129.62 g   215.76 g   343.34 g   2 g $H_2Te + 2 AgOH \rightarrow Ag_2Te + 2H_2O$  (Eq. 44)
1 mol   2 mol   1 mol   2 mol
129.62 g   249.76 g   343.34 g   36 g

FIG. 14

$2CaO + 3TeO_2 \rightarrow Ca_2Te_3O_8$ (Eq. 45)

2 mol   3 mol   1 mol 112 g   478.8 g   590.95 g $CaO + TeO_2 \rightarrow CaTeO_3$ (Eq. 46)

1 mol   1 mol   1 mol 56 g   159.6 g   215.68 g $2CaO + 3SeO_2 \rightarrow Ca_2Se_3O_8$ (Eq. 47)

2 mol   3 mol   1 mol 112 g   332.88 g   445 g $CaO + SeO_2 \rightarrow CaSeO_3$ (Eq. 48)

1 mol   1 mol   1 mol 56 g   110.96 g   167 g $CaO + Re_2O_7 \rightarrow Ca(ReO_4)_2$ (Eq. 49)

1 mol   1 mol   1 mol 56 g   484.41 g   1040.9 g

FIG. 15

$$CaCO_3 + ReO_3 \rightarrow CaReO_3 + CO_2 \quad \text{(a perovskite like structure)} \qquad (Eq.\ 50)$$

$$Re_2O_7 + Al_2O_3 \cdot SiO_2 \rightarrow Re_2O_7/SiO_2\text{-}Al_2O_3 \qquad (Eq.\ 51)$$

1 mol   1 mol            1 mol 484.41 g   162 g         646.45 g $$RhO_4 + 4H_2 \rightarrow Rh_{(S)} + 4H_2O \qquad (Eq.\ 52)$$

1 mol   4 mol   1 mol   4 mol 166.9 g   8 g   102.91 g   72 g $$8CaCO_3 + 2Rh_2O_3 + O_2 \rightarrow 4Ca_2RhO_4 + 8CO_2 \qquad (Eq.\ 53)$$

8 mol         2 mol         1 mol   4 mol         8 mol 800.72 g   507.62 g   16 g   988 g   352 g $$RhO_4 + B_2O_3 * SiO_2 \rightarrow RhB_2O_7 * SiO_2 \qquad (Eq.\ 54)$$

1 mol   1 mol         1 mol 166.9g   129.7 g       296.6 g

FIG. 16

| Absorbent | Optimal Temperature (°C) | Chemisorption Capacity (mg-$I_2$/g) | Decontamination factor | NOx Resistance | Commercial Application |
|---|---|---|---|---|---|
| AgX | 150 | 500 ~ 250 | $10^2 \sim 10^5$ | Weak | Commercial |
| AgZ | 150 | 170 ~ 500 | $10^2 \sim 10^5$ | Strong | Lab-scale |
| Ag°Z | 150 | 170~ 500 | $10^2 \sim 10^5$ | Strong | Commercial |
| AC-6120 | 130 | 140 | $10^2 \sim 10^5$ | Strong | Commercial |
| AgA[a] | 130 | 100~500 | $10^2 \sim 10^5$ | Strong | Lab-scale |
| CdX | 150 | 5 ~ 10 | - | Weak | Lab-scale |
| PbX | 150 | 5 | - | Weak | Commercial |
| 13X | <50 | 5 | $10^5$ | Weak | Lab-scale |

Table 1: Comparison of performance of solid sorbents/reagents for removing radio-iodine.

FIG. 17

| Absorbent Parameters | AgX | Ag°Z | AC-6120 |
|---|---|---|---|
| Relative humidity (R.H) | Slight effect up to 70% R.H. | Slight effect up to 70% R.H. | Slight effect up to 70% R.H. |
| NO gas | Uncertain | No influence up to 2% NO conc. | Uncertain |
| $NO_2$ gas | Negative effect on DF | No influence up to 2% NO conc. | Protection function of Ag oxidation |
| $CO_2$ gas | Negligible | Negligible | Negligible |
| Temperature | Optimal temperature of 150°C | Optimal temperature of 150°C ~500°C | Optimal temperature of 150°C |
| Effecting impurity | Dodecane, $H_2S$ | Dodecane, H2S | Negligible |
| Column material | Stainless steel | Stainless steel | Stainless steel |
| Applicability to voloxidation | Applicable - Advantage: high Iodine loading capacity | Suitable - Disadvantage: high absorbent cost | Applicable - Advantage: low absorbent cost |

Table 2: Comparison of solid absorbent/reagents for removing radio-iodine.

FIG. 18

|  | Clay materials | Fly Ash |
|---|---|---|
| Description | Metakaolin, bentonite, pyrophyllite | Fly Ash |
| Reaction | Chemical adsorption | Chemical adsorption |
| Advantages | Formation of $CsAlSiO_4$, pollucite ($CsAlSi_2O_6$) and/or $CsAlSi_5O_{12}$ | - Formation of pollucite<br>- Good thermal stability<br>- Good manufacturability<br>- Very cheap material cost |
| Disadvantages | - High operation temperature ( > 450°C)<br>- Difficult to form<br>- Dispersion of powder<br>- High pressure drop | - High operation temperature ( > 450 °C) |
| D. F | 100 | 1,000 |
| State of development | Lab-scale (Non-active test) | Lab-scale (radioactive test) |

Table 3: Comparison of fixation (trapping) methods for cesium.

FIG. 19

|  | Adsorption on Solids |
|---|---|
| Description | By chemical reaction between gas and solid absorbent (Y, Ca, Ba, and Sr) at over 600 °C |
| Advantages | Formation of stable chemical compounds and good thermal stability |
| Disadvantages | Discontinuous operation |
| Development Status | Lab Scale |
| Remarks | - ERERC, US - Most promising: under development at KAERI |

Table 4: Comparison of trapping methods for technetium.

FIG. 20

| Structure | VFA | Expected Chemical Reaction |
|---|---|---|
| Perovskites (MRuO$_3$) | BaCO$_3$ | BaCO$_3$ + RuO$_2$ → BaRuO$_3$ + CO$_2$(g) |
| | CaCO$_3$ | CaCO$_3$ + RuO$_2$ → CaRuO$_3$ + CO$_2$(g) |
| | SrCO$_3$ | SrCO$_3$ + RuO$_2$ → SrRuO$_3$ + CO$_2$(g) |
| Pyrochleres (M$_2$Ru$_2$O$_7$) | Y$_2$O$_3$ | Y$_2$O$_3$ + 2RuO$_2$ → Y$_2$Ru$_2$O$_7$ |
| | Nd$_2$O$_3$ | Nd$_2$O$_3$ + 2RuO$_2$ → Nd$_2$Ru$_2$O$_7$ |
| Hollandite (MRu$_4$O$_8$) | K$_2$O | K$_2$O + 8RuO$_2$ → 2KRu$_4$O$_8$ + 1/2O$_2$(g) |
| | Rb$_2$O | Rb$_2$O + 8RuO$_2$ → 2RbRu$_4$O$_8$ + 1/2O$_2$(g) |
| | Na$_2$O$_2$ | Na$_2$O$_2$ + 4RuO$_2$ → 2NaRu$_2$O$_4$ + O$_2$(g) |
| | Li$_2$O | Li$_2$O$_2$ + RuO$_2$ → Li$_2$RuO$_3$ |

Table 5: Expected chemical reactions of metal ruthenate.

FIG. 21

| VFA | Reaction Product | Trapping capacity (g-Ru/g-material) |
|---|---|---|
| CaO | CaRuO$_3$ | 1.82 |
| CaCO$_3$ | CaRuO$_3$ | 1.01 |
| SrCO$_3$ | SrRuO$_3$ | 0.68 |
| BaCO$_3$ | BaRuO$_3$ | 0.51 |
| Li$_2$O | Li$_2$RuO$_3$ | 4.41 |
| Y$_2$O$_3$ | Y$_2$Ru$_2$O$_7$ | 0.89 |
| Nd$_2$O$_3$ | Nd$_2$Ru$_2$O$_7$ | 0.20 |

Table 6: Comparison of stoichiometric capacities of trapping materials.

FIG. 22

| Adsorbent | Advantages | Disadvantages | Remarks |
|---|---|---|---|
| Silica gel | -effective sorbent at low temperature (about 80 °C): removal efficiency of about 99.8%<br>-regeneration available | -temperature limit: under 100°C<br>-over 100 °C: decrease of DF values (loss of thermal stability) | -generally silica gel includes impurities (Fe, Co, Ni, Cr, *etc.*) |
| Metal oxide ($Fe_2O_3$, $TiO_2$, $MnO_2$ etc.) | -500~550 °C: 99.5%<br>-good trapping capacity and good resistance<br>-against impurities --- good trapping stability | -over 600 °C: ruthenium desorption<br>- $Fe_2O_3$ powder difficulty in fabrication process | |
| Yttria ($Y_2O_3$) | -below 1400 °C: good thermal stability | -higher operation temperature (900°C) | -$Y_2Ru_2O_7$ formation (pyrochlore) |
| Complex metal [oxide alkaline earth metal ($BaCO_3$) + metal oxide] | high efficiency:<br>- $BaCO_3$-$Fe_2O_3$ at 450~750 °C, 95~96% -<br>$BaCO_3$-$TiO_2$ at 650 °C, 95%<br>- $BaCO_3$-$MnO_2$ at 550~750 °C, 94%<br>-high efficiency for a long time: for 60 hours in [$BaCO_3$-$Fe_2O_3$] | -not available solidification over 1500 °C (loss of thermal stability and generation of $CO_2$) | -need to develop adsorbent including higher thermal stability, stability of filter trapped and high efficiency for a long time over 1500 °C |

Table 7: Comparison of trapping methods for ruthenium.

FIG. 23

MANAGING VOLATILES IN NUCLEAR WASTE VITRIFICATION

PRIORITY NOTICE

The present application claims priority under 35 U.S.C. § 119(e) to U.S. provisional patent application No. 63/064,183 filed on Aug. 11, 2020, the disclosure of which is incorporated herein by reference in its entirety.

The present patent application is a continuation-in-part (CIP) of U.S. non-provisional patent application Ser. No. 16/815,402 filed on Mar. 11, 2020, and claims priority to said U.S. non-provisional patent application under 35 U.S.C. § 120. This identified U.S. non-provisional patent application is incorporated herein by reference in its entirety as if fully set forth below.

TECHNICAL FIELD OF THE INVENTION

The present invention relates in general to in-situ vitrification of waste material in human-made deeply located subterranean caverns and more specifically to management, treatment, and/or removal dangerous volatile materials produced during the vitrification processes.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

In the United States (U.S.) and other countries across the globe, the nuclear weapons production industry has left a massive and devastating legacy when the nuclear reactors were decommissioned. For example, the weapons manufacturing process left behind about 53 million U.S. gallons (or about 500,000 cubic meters [$m^3$]) of high-level radioactive waste stored within 177 storage tanks. In addition, 25 million cubic feet ($ft^3$) (or about 710,000 cubic meters [$m^3$]) of solid radioactive waste and a resulting contamination zone covering several square miles of contaminated groundwater exists beneath the site. Much of this liquid waste has been leaking into the surrounding earth creating significant health and environmental problems. There is a tremendous safety and environmental need to store and/or dispose of such radioactive materials. Radioactive waste is generally categorized as high-level waste (HLW) or low-level waste (LLW).

In the past, radioactive and/or nuclear materials (such as waste materials) have been stored in barrels, individual capsular containers, as slurry material, in open pits and also within shallow mines which are very close to the surface of the Earth. In the past, it has been challenging, dangerous, and expensive to try to store radioactive and/or nuclear materials (such as waste materials) in underground cavern-like structures.

Many processes have been studied, proposed, and/or implemented in different forms to dispose of, get rid of, and/or contain these dangerous radioactive waste materials. For example, some form of vitrification has been tried in several countries.

Vitrification is a process in which a substance is transformed into a glass. Glass may be defined as a non-crystalline amorphous solid. Glass may also be defined in a broader sense to include solids that are amorphous in structure at the atomic scale and that exhibit a reversible change from a hard and relatively brittle state into a viscous or rubbery state when sufficiently heated. This reversible change point is defined as the glass transition point. Vitrification is usually achieved by heating materials to a liquid state, then cooling the liquid, often rapidly, so that it passes through the glass transition to form a glassy solid.

In practice, vitrification involves melting of waste materials with glass-forming additives, often called "frit," so that the final vitreous product incorporates the waste contaminants macroscopically and microscopically. The vitrified glass material is often referred to as "melt" during the glass-forming process. In the macroscopic glass form, the waste material may be considered encapsulated while in a microscopic form such that the waste forms an integral structural part of the glass material.

The vitrification process may be implemented in two ways: by either a continuous feed operation in which the feed (waste) is introduced in a continuous or momentarily intermittent stream into the melter or by a batch type operation in which measured quanta (volumes/amounts) of waste or feed are introduced into a melter system and melted or vitrified over a period of time. The batch process may be repeated several times. In some embodiments herein the batch type system is contemplated. In the vitrification heating process, complex chemical reactions may occur and gases and other volatiles may be evolved during the chemical interactions between various constituents of the feed material. Some of the volatile products and gases may be dangerously radioactive and long lived with half-lives lasting tens of thousands of years. There is therefore a need to capture or keep these volatiles isolated and controllably removed from entering the environment. In the vitrification process after heating is established, a cold cap which consists of a finite layer of reacting material floating on the surface of the molten material at the top of the vitrification vessel or melter, is initiated and later becomes functional and fully developed. During the continued vitrification process this floating reaction zone or the "cold cap" by virtue of its temperature distribution and physical characteristics and foaming action occurring therein, may allow for complex reactions to occur in which the dangerous or radioactive volatiles which may be produced during the vitrification process may be modified by chemical interactions with chemical reagents which may be introduced into or added to the cold cap zone. The thickness of the cold cap region may vary depending on the ratio of the rate of heat flux generation from the melt zone and the heat loss above the cold cap. Published data indicates that the cold cap thickness may be between at least 2 cm to more than 15 cm depending on the heat generation rates in the melt. It is within this cold cap zone that the necessary reactions which provide the means to manage the volatile materials and products may be implemented by the embodiments taught by this patent application.

Glass has many physical and chemical properties and attributes that make such glass suitable and/or desirable for use in waste disposal, such as, being reliable in immobilizing the waste, being safe for long-term storage, being safer for handling and/or transportation operations. Glass is amorphous. Glass has been shown to be generally insensitive to the effects of radiation and radioactive decay. The finished glass material can chemically and physically incorporate many waste elements and products over wide composition ranges. The basic glassmaking process has been practiced for millennia, it is relatively simple and offers a means for waste disposal in radioactive operations in which massive volumes of HLW, LLW, and/or other dangerous wastes need to be safely disposed. The HLW that has to be disposed of, contains insufficient amount of glass precursors, e.g., silicon, and as such, to produce a long-lived glass product silica and other glass-forming must be added chemically and/or as a glass product called frit to vitrify HLW and/or other similar radioactive wastes.

The vitrification process applied to nuclear waste is attractive; flexible, and applicable to a variety of radioactive elements that may be incorporated in such glasses. In addition, the glass product is minimally leachable, resists corrosion, is durable; and the compactness, volume reduction, and ease of handling of the glass formed waste are all positive attributes. For example, natural analogues of vitrified products include silicate glasses found in the geologic record from volcanic glasses, these records have displayed minimal degradation processes over several million years.

Vitrification is a mature technology and has been used for HLW immobilization in many batch or continuous processes in limited volumes for more than 40 years in France, Germany, Belgium, Russia, the United Kingdom (UK), India, Japan, and in the U.S.

The prevailing and preexisting concepts in vitrification of nuclear waste, focus on the long-held view currently exhibited by the major U.S. companies disposing of nuclear waste. These companies are spending an enormous of money, e.g., up to $37 Billion projected for 2019 to: vitrify the waste in massive plants employing several thousand individual staff; storage of the vitrified products in stainless steel containers; transport of the vitrified products to a disposal location; entombing the vitrified products containers in shallow salt formations; and then waiting and hoping for mother nature to encapsulate the glass bearing containers to be subsumed by the salt encroachment over thousands of years of geologic time before leaching or surface contamination can occur via migration of radionuclides.

The prevailing and preexisting concepts in vitrification of nuclear waste are less than ideal and are in fact seriously problematic. This process has essentially spent billions of dollars to "kick the can down the road." The waste may be temporarily contained but the waste has not been disposed, nor has the waste been sufficiently isolated from nearby ecosystems, environments, and ground waters.

Today (circa 2021), there is a well felt need for a better and more complete solution to the HLW and LLW waste problem.

It is at least one objective of this inventive application to solve the containment and disposal problem as completely as possible.

To this end, this patent application combines some existing prior art elements and introduces additional novel elements to attain a level of disposal and containment that hitherto has not been achieved by providing a subterranean deeply located in-situ vitrification process which may further manage, treat, and/or contain the evolved volatile radioactive constituents (which are dangerous byproducts of the vitrification process) in deeply located geological formations, from which no material can migrate over millions of years of geologic time.

Previously, there has not been any attempt to manage, treat, and/or contain the volatized (radioactive) effluents, from the vitrification, in-situ, in very deep human-made caverns as illustrated in the subject patent application. This may be because: (1) such caverns do not generally naturally exist in rock formations at very great depths; (2) it had been impossible to economically fabricate or produce large diameter caverns or to implement them in deep enough geological formations which are necessary to maintain a level of safety such that there would be no migration of radionuclides from the radioactive materials to the surface over geologic time; (3) the requisite technology to vitrify the waste material though available at the surface has only been tried in shallow surface pits and has not been extended to deep underground systems; (4) the electrical power systems needed to transmit, control and deliver sufficient electric power to deep downhole heaters had not been safely perfected; and/or the like.

The surface process of vitrification is quite simple (at or near the Earth's surface): (1) the waste is dried, then heated to convert the nitrates to oxides; (2) glass-forming additives or frit are added to the waste material and heated again to around 1000 degrees Celsius (° C.); (3) the molten liquid is poured into a suitable containment vessel to cool and form the solid glass; (4) the solidified vitreous product has incorporated the waste materials in its macro- and microstructures, and the hazardous waste constituents are immobilized.

Borosilicate and phosphate glasses are the two main types of glass frit currently used to immobilize nuclear waste in surface vitrification operations. Both of these materials can immobilize large amounts of radioactive products.

The ability to economically provide a human-made cavern, in a deep geologic formation, of sufficient size and volume, for efficient in-situ waste vitrification and also for safe disposal of substantial quantities of vitrified radioactive waste is now feasible today. What is required is more than just the ability to vitrify some small amounts of nuclear waste in a series of surface batch operations, there are real needs for the economic vitrification, disposal and storage of massive quantities of waste in the millions of gallons. To date (2021), the current best available technology at the Hanford site in the U.S. contemplates an expensive, single, stand-alone vitrification unit. If that unit fails, the whole vitrification industry stops; until a better solution is found. This current approach has no failsafe feature since there is only one plant contemplated to dispose of the HLW. A better means is needed.

Elements, systems and/or methods as proposed herein are different than the prior art. Embodiments of the present invention may provide elements, systems and/or methods to significantly multiply and scale these solutions to fit the need and demands. Embodiments of the present invention may run multiple systems in parallel as needed to meet the need and demands. Just like in the oil and gas industry where literally dozens of oil wells can be drilled by individual drilling rigs simultaneously to develop a given field, a plurality of vitrification systems can be implemented simultaneously to provide up to fifty or more simultaneous in-situ vitrification operations at the same location (or different locations). Embodiments of the present invention may provide a measurable economy of scale to resolve this seemingly intractable problem of disposing millions of gallons of waste.

Some of the technical drivers that have allowed the embodiments of present invention herein to be implemented may be as follows: (1) improvements in drilling rigs; (2) improvements to underreaming capabilities/operations using drilling rigs; (3) improvements in electrical power delivery/distribution, management, and/or control; (4) improvements in heating means; and/or the like.

Drilling rig design features have improved. Hydraulic pressure availability downhole in the wellbore at the drill bit has been increased. The available drilling rig horsepower has been increased up to as much as 4,000 hydraulic horsepower. Available pump horsepower has increased. Available rig capacity up to two million (2,000,000) pounds of dead weight lift is available. High downhole drilling fluid pressures can be maintained. Such drilling rig improvements provide for ease of implementation of deeply located human-made caverns for insitu vitrification and for loading or disposing of waste products into such deeply located human-made caverns.

Specific technological improvements that pertain to the drilling underreaming operations and underreaming equipment have allowed successful underreaming needed to make and manage large diameter human-made caverns that may be located with deeply located geological formation(s). Some of these underreaming improvements may include: hydraulically actuated reamer elements expandable and retractable with pump pressure and downhole RFID (radio frequency ID) triggering with injected RFID tags; cutter arms move upward and out simultaneously in the body; fail-safe cutter arm retraction; reverse actuating mechanism maintains that tool is open while drill string weight prohibits tool closure; unrestricted fluid flow through internal diameters of the wellbore tubular goods; roller cone cutters are specifically designed for the Drill Time Under-Reamers and are consistent with downhole diameters; reamer bodies machined from heat-treated steel bar, giving the reamer bodies exceptional strength; jet nozzles near the cutters allow for cutter washing and cooling; a variety of cutting structures are available to facilitate the reaming process; and/or the like.

Additionally, the electric power and applied industries have developed and implemented improved, surface facilities, control mechanisms and power cables which deliver electric power efficiently and controllably to the downhole heater equipment. Power cables have significant improvements and are now capable of transmitting megawatts of power over several thousand feet in a wellbore environment regularly and safely without accident. These computerized systems can minimize power losses in transmission, maximize energy deliverability, allow the types of temperature control needed to optimize the melt process and the annealing and cooling of the melt in the subterranean cavern during vitrification.

Today (2021), the understanding of vitrification processes and operational conditions have improved considerably. The compositions of the waste, the chemical and physical formulation of the frit and other physical descriptors have been studied by investigators across the globe. Additionally, the development and application of computational fluid dynamic modelling platforms for vitrification simulation have provided insights into and preconditions necessary for an optimal vitrification process without the need for hundreds of time consuming and ineffective laboratory or small-scale experiments.

Though most physical test efforts have been on small-scale experiments, it is generally accepted that larger batch operations can be more tolerant to compositional variations than small-scale laboratory tests. Embodiments of the present invention taught in this patent application may be for very large human-made cavern based waste systems in which several tons of waste are controllably vitrified in massive deeply located underground cylindrical human-made cavern(s) with heater(s) electrically powered and controlled from the Earth's surface.

In sum, some embodiments of the present invention may provide elements, devices, apparatus, products, machines, systems, mechanisms, means, and/or methods for the in-situ vitrification and/or disposal of radioactive materials within human-made subterranean caverns that are themselves located within deep geological formation(s); and wherein the dangerous volatiles produced from the vitrification may be managed, treated, and/or contained also within the given deep geological formation(s); in manners that may be safe (for humans and the environment), economically feasible, and efficient.

These and other advantages and features of the present invention are described herein with specificity so as to make the present invention understandable to one of ordinary skill in the art, both with respect to how to practice the present invention and how to make the present invention.

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe elements, devices, apparatus, products, machines, systems, mechanisms, means, and/or methods for the management, treatment, and/or containment of at least some volatiles that may be evolved during vitrification of (radioactive) waste materials (including nuclear and non-nuclear materials) in deeply located underground human-made caverns, wherein such human-made caverns are located within deep geologic formation(s).

In light of the problems associated with the known methods of controlling these volatile vitrification byproducts and/or their derivatives, it may be an object of some embodiments, to provide at least one method for modifying or changing the vitrification process for nuclear waste and other materials in human-made caverns which is safe, with a high volumetric capacity, cost-effective, easily deployable, and may meet the regulatory requirements for safety and environmental protection. It may be another object of some embodiments to provide at least one method of the type described herein wherein the modified vitrification process occurs several thousand feet below the Earth's surface, below the water tables, away from potential contamination of the ecosphere by the evolved volatile byproducts and/or their derivative compounds.

Briefly, the modified vitrification method in accordance with some embodiments of this invention may achieve at least some of the intended objectives by comprising steps of: quantitively analyzing the chemical processes involved in the production of volatiles during the planned/proposed HLW vitrification operations (this may be an optional step); drilling a pilot well which intersects a deep geologic formation (with a drill rig); forming at least one human-made cavern within that deep geological formation (via underreaming operations with a drill rig); filling (to a predetermined level) that human-made cavern with waste (and frit) to be vitrified; implementing an electrically powered energizable heating system at the subject human-made cavern into which the waste products are disposed for subsequent vitrification for providing the necessary heat for the vitrification; while safely managing, treating, processing, fixing, containing and/or disposing of at least some of the volatile vitrification byproducts in a cold-cap section of the human-made cavern; and while allowing the melted vitrified waste and the solidified (fixed) products of the volatiles to remain sequestered in the human-made cavern above the glass products for thousands to millions of years. Some of these steps may be optional.

The present disclosure relates to methods for operating vitrification systems for the high-level waste disposal, and more particularly to methods for operating the in-situ vitrification of the high-level waste in deep underground geological human-made cavern systems utilizing a cold-cap system modified and operated to stabilize and immobilize at least some of the volatiles that are produced during the vitrification process.

Systems and methods are disclosed for the vitrification of waste materials such as radioactive wastes and particularly high-level radioactive wastes. The inventive methods herein improve the efficiency of the vitrification process by implementing chemical reactions which occur primarily in the cold-cap region of the human-made cavern to form compounds which remain incorporated (fixed) in the cold-cap and thereby prevent at least some of such volatiles from being disseminated away from the vitrification location that is within a deep geologic formation.

In one embodiment, a method of managing at least some of the volatiles formed during the vitrifying process may include steps of providing a high-level waste for vitrification; providing a glass frit additive or glass forming chemicals or both for mixing with the waste; providing a cold-cap; providing a source of volatile fixing additives (VFAs) (reagents); and, feeding the waste, the glass frit or glass forming chemicals or both, and VFAs to a melter system for vitrification of the waste so that formation of selected dangerous volatiles is managed. The VFAs are generally expected to be implemented in a cold-cap that is located within the human-made cavern.

In some embodiments, a method may comprise selecting the VFAs from a group comprising particular reagents which have been demonstrated to chemically and/or physically fix, combine, and/or react with the specific volatiles so that the modified compounds remain in or near the cold-cap region and/or melt region within the human-made cavern.

It is at least one objective of this inventive application to solve the containment and disposal problem with respect to radioactive wastes as completely as possible.

It is an objective of the present invention to provide for radioactive waste disposal that is safer, more efficient, more cost effective, cheaper, more easily built, more easily implemented, more easily maintained, more scalable, faster, handles greater volumes of waste, satisfies/meets regulatory requirements, as compared to prior art methods.

It is another objective of the present invention to provide for radioactive waste disposal that treats significantly larger volumes of waste products as compared to prior art methods.

It is another objective of the present invention to provide for radioactive waste disposal that is capable of operating for significantly longer times as compared to prior art methods.

It is another objective of the present invention to provide systems and/or methods for the in-situ vitrification of radioactive waste (or other waste materials) within human-made caverns that are located within deep geologic formation(s).

It is another objective of the present invention to provide systems and/or methods for managing, treating, and/or containment of at least some (radioactive) volatile byproducts produced from the in-situ vitrification of waste within human-made caverns that are located within deep geologic formation(s).

It is another objective of the present invention to provide a cold-cap with predetermined chemical(s)/compound(s)/reagent(s) for managing, treating, and/or containment of at least some (radioactive) volatile byproducts produced from the in-situ vitrification of waste, wherein the cold-cap is located within the human-made cavern.

It is another objective of the present invention to provide a cold-cap with volatile fixing additives (VFAs) for managing, treating, and/or containment of at least some (radioactive) volatile byproducts produced from the in-situ vitrification of waste, wherein the cold-cap is located within the human-made cavern.

It is another objective of the present invention to dispose of vitrified waste products in safe deep underground locations.

It is another objective of the present invention to provide a simple treatment solution to vitrification off-gases.

It is yet objective of the present invention to provide a safe deep underground location for (treated) off-gases disposal.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 3B may show a region identified as Detail 3C within the given human-made cavern.

FIG. 7 shows chemical reaction equations (1) through (5).

FIG. 8 shows chemical reaction equations (6) through (11).

FIG. 9 shows chemical reaction equations (12) through (16).

FIG. 10 shows chemical reaction equations (17) through (24).

FIG. 11 shows chemical reaction equations (25) through (29).

FIG. 12 shows chemical reaction equations (30) through (34).

FIG. 13 shows chemical reaction equations (35) through (39).

FIG. 14 shows chemical reaction equations (40) through (44).

FIG. 15 shows chemical reaction equations (45) through (49).

FIG. 16 shows chemical reaction equations (50) through (54).

FIG. 17 depicts Table 1, a comparison of performance of solid sorbents/reagents for removing radio-iodine.

FIG. 18 depicts Table 2, a comparison of solid absorbent/reagents for removing radio-iodine.

FIG. 19 depicts Table 3, a comparison of fixation (trapping) methods for cesium.

FIG. 20 depicts Table 4, a comparison of trapping methods for technetium.

FIG. 21 depicts Table 5, expected chemical reactions of metal ruthenate.

FIG. 22 depicts Table 6, a comparison of stoichiometric capacities of trapping materials.

FIG. 23 depicts Table 7, a comparison of trapping methods for ruthenium.

Figure 1:
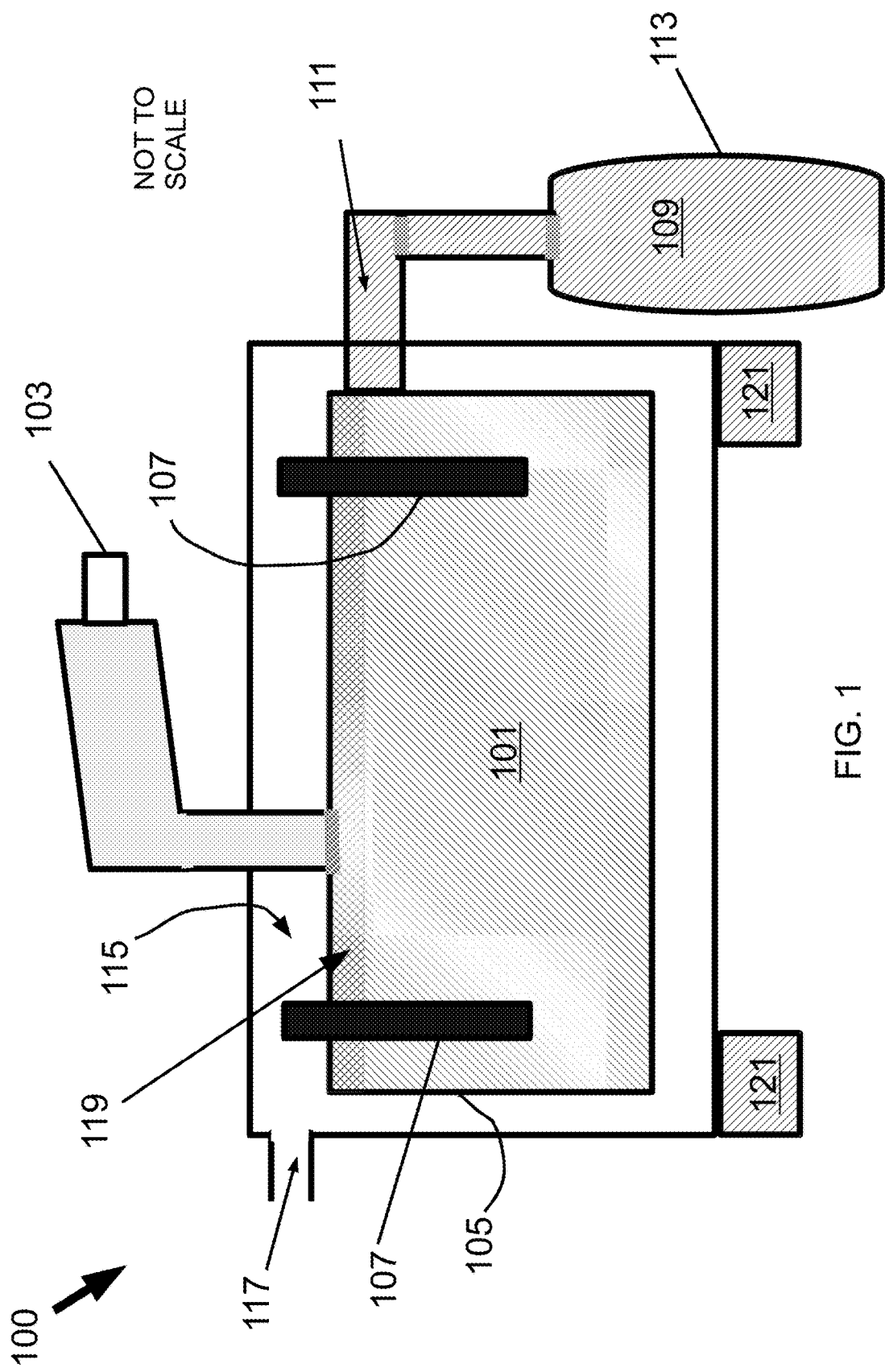
FIG. 1 illustrates a prior art technology that was developed by the United States Department of Energy (USDoE) for in-situ joule heating to convert near surface contaminated soils and wastes into glass products.

REFERENCE NUMERAL SCHEDULE 100 calciner/vitrifier 100
101 waste (contaminated soil) (melt) 101
103 inlet 103
105 melt chamber 105
107 (graphite) electrode 107
109 glass product (or crystalline product) 109
111 outlet 111
113 storage container 113
115 off-gas 115
117 outlet vent 117
119 cold cap 119
121 support 121
200 system for in-situ waste vitrification 200
201 human-made cavern 201
203 wellbore 203
207 deep geologic formation 207
209 Earth's surface (ground level) 209
211 waste 211
213 rig 213
215 power-source 215
217 site (wellhead) 217
219 cabling 219
221 heater 221
223 vane/mixer 223
225 weight 225
227 cold-cap 227
229 top 229 (of human-made cavern 201)
231 top 231 (of cold-cap 227)
233 bottom 233 (of cold-cap 227)
235 volatiles 235
235a off-gas-post-treatment 235a
235b off-gas in formation 235b
235c leading-edge of off-gas in formation 235c
237 gas-cap 237
239 casing 239
241 downhole sealing packer 241
243 boundary 243 (between different rock/formations)
245 side-wall 245 (of human-made cavern 201)
301 bottom 301
311 cooler upper zone 311
313 warmer lower zone 313
315 boundary layer 315
321 insulating (sealing) blanket 321
500 method of managing vitrification produced volatiles in deep underground cavern 500
501 step of determining volatiles from vitrification 501
502 step of constructing and/or installing necessary infrastructure and/or hardware 502
503 step of determining VFA(s) to react with the determined volatiles 503
505 step of loading waste, frit, and/or glass former materials into human-made cavern 505
507 step of energizing heaters initiating cold-cap above waste in human-made cavern 507
509 step of vitrifying the waste, frit, and/or glass former materials in cavern 509
511 step of produced volatiles penetrating and/or permeating into cold-cap 511
513 step of adding (introducing) VFA(s) to cold-cap for reaction with volatiles 513
515 step of the vitrification process continuing until completion 515
517 step of installing insulating blanket in human-made cavern above cold-cap 517
519 step of determining if a given cavern is full or can accept more waste 519
521 step of shutting down and/or sealing off wellbore(s) and/or cavern(s) 521
523 step of installing at least portions of vitrification means into cavern(s) 523
600 method of determining cold-cap components 600
601 step of quantitative chemical analysis 601
603 step of selecting sorbent(s) and/or reagent(s) for use in cold-cap 603
605 step of defining/determining cold-cap component(s) 605
607 step determining if other vitrification processes contemplated 607

DETAILED DESCRIPTION OF THE INVENTION

In this patent application, the terms "radioactive material," "radioactive waste," "nuclear material," "nuclear waste," and/or "high-level nuclear waste" (HLW) may be used interchangeably. In addition, the term "waste" generally means nuclear and/or radioactive waste of any kind.

"Chemical" as used herein may refer to a substance with a distinct and/or predetermined molecular structure; a substance with a molecular formula disclosed herein; and/or a substance with a commonly and readily understood common name (e.g., a carbonate as a common name is commonly and readily understood to include $CO_3$).

In this patent application, the terms "fixing," "trapping," "immobilizing," and/or "stabilizing" may refer to a process wherein a volatile material/chemical is absorbed or adsorbed by another material or compound (reagent); and/or is converted from a volatile species to a non-volatile species (e.g., converted into a solid, liquid, and/or gel like species). Further, the converted former volatile species may be retained in/on (and/or near) a cold-cap as a solid (or solid like). These chemicals, chemical species, materials, compounds, and/or reagents that interact with the given volatile to result in retention of the former volatile in the cold-cap may be referred to as a "volatile fixing additive" (VFA) and/or as "at least one volatile-fixing-additive" within the claims. "Volatile fixing additive," "volatile-fixing-additive," VFA, and/or reagent may be used interchangeably herein.

In this patent application, "formation," "zone," "host," "host rock," and/or "rock medium," may be used interchangeably; and unless otherwise specified, may refer to a rock structure within a "deep geological formation" that may be hosting (housing) one or more human-made caverns.

In this patent application, the terms "cavern," and "cavity" may be used interchangeably with a same meaning. Further, "cavern" or "cavity" may mean a cavern/cavity that may be human-made (e.g., from underreaming operations within a given deep geologic formation).

In this patent application, the terms "well" and "wellbore" may be used interchangeably and may refer to cylindrical drilled out elements implemented in design and/or installation processes of some embodiments of the present invention.

In this patent application, "vertical wellbores" need not be geometrically perfectly vertical; but rather may be substantially vertical (e.g., more vertical than horizontal with respect to the Earth's surface). That is, a vertical wellbore may be substantially (mostly) parallel with a direction of a local gravitational field. Conversely, "horizontal" may be substantially (mostly) orthogonal with a direction of a local gravitational field.

In this patent application, the terms "single well" or "common well" may refer to a wellbore that may be shared.

In this patent application, the terms "wellbore packer," "packer," "wellbore seal," "HYDRIL," may be used interchangeably to mean a sealing device or a sealing system to seal an internal bore of a given wellbore.

In this patent application, the term "ream," "underream" and/or "under-ream" may be used interchangeably to mean the enlarging of a wellbore or hole in a rock medium.

Note, as used herein: "° C." may be an abbreviation for degrees Celsius; "mol" may be an abbreviation for "mole"; "g" may be an abbreviation for "grams"; "(g)" in a chemical reaction equation may be an abbreviation for gas phase; and "(s)" in a chemical reaction equation may be an abbreviation for solid phase. Unless otherwise stated, temperatures (temp) noted herein are in degrees Celsius (° C.).

Various embodiments of the present invention show, describe, and teach management, treatment, fixing, trapping, stabilization, immobilization, conversion, and/or the like of various dangerous and/or undesirable volatiles into chemical species that may be generally be retained in, on, and/or near a cold-cap. These dangerous and/or undesirable volatiles may be radioactive and/or toxic to many ecosystems and/or environments. These dangerous and/or undesirable volatiles may be byproducts from nuclear operations (e.g., fission and/or decay) and/or may be byproducts from vitrification processes of nuclear waste products.

Some embodiments of the invention may be described with non-limiting examples. In all examples, the volatile materials produced may be managed by sequestering the modified products (i.e., the former volatile) in, on, and/or near the cold cap region of the vitrification system.

In the following description, and for the purposes of explanation, numerous specific details, apparatus, devices, systems, methods, process steps, process steps, process durations, and/or specific chemical formula are set forth in order to provide a thorough understanding of the various aspects of the various embodiments of the present invention. It will be understood, however, by those skilled in the relevant arts, that the apparatus, systems, and methods herein may be practiced without each and every of such these specific details, process durations, and/or specific chemical formula. It is to be understood that other embodiments may be utilized, and structural and functional changes may be made without departing from the scope of the apparatus, systems, and methods herein.

In other instances, known structures and devices are shown or discussed more generally in order to avoid obscuring the embodiments. In many cases, a description of the operation is sufficient to enable one to implement the various forms, particularly when the operation analysis is to be implemented in analytical simulations. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying chemical equations, that are molarly balanced, and in which is shown by way of illustration various embodiments in which the systems, methods, processes, and/or apparatuses disclosed herein may be practiced. It is to be understood that other embodiments may be utilized, and structural and functional changes may be made without departing from the scope.

The present invention may be explained in greater detail in the following non-limiting examples for the treatment of various volatiles produced during the vitrification process for high level waste disposal.

As noted above, embodiments of the present invention may describe various devices, apparatus, systems, mechanisms, means, methods, processes, and/or the like for the management of volatiles produced during the vitrification of radioactive materials and other waste products and/or volatiles resulting from nuclear operations. This vitrification may occur in surface systems or within human-made subterranean cavities within deep geological formations. In some embodiments, sequential operations of the vitrification process may be implemented.

In some embodiments, a method may provide an operational method for nuclear waste disposal. Such operational methods described herein may provide more efficient methodology to allow safer, more economical and long-lasting disposal of the nuclear waste in the deep underground human-made caverns.

The novel features which are considered characteristic for various embodiments of the invention are set forth in the appended claims. Embodiments of the invention itself, however, both as to its construction and its methods of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims. In addition, certain elements may be omitted from certain drawings to enhance clarity without detracting from the meaning or the idea taught in the drawing.

These and other advantages and features of the present invention are described herein with specificity so as to make the present invention understandable to one of ordinary skill in the art, both with respect to how to practice the present invention and how to make the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 illustrates a prior art technology (e.g., a calciner/vitrifier 100) that was developed by the United States Department of Energy (USDoE) for in-situ joule heating to convert near surface contaminated soils and wastes to a glass product 109 or a crystalline product 109. In a nutshell contaminated soil (waste 101) is introduced via an inlet 103 to a melt chamber 105, wherein (graphite) electrodes 107 are used to melt the contaminated soil 101 into the glass product 109 or the crystalline product 109. While the glass product 109 or the crystalline product 109 is still flowable (and hot), it is passed out of an outlet 111 from the melt chamber 105 into a storage container 113 wherein the glass product 109 or the crystalline product 109 cools and solidifies. The graphite electrodes 107 may produce electrical energy which heats up the soil waste mixture 101 and which eventually liquefies and provides a path for the electric power. The soil waste mixture 101 may be heated up to 2,000 degrees Celsius (° C.). Pyrolysis products produced in the melting process, such as off-gas 115, migrate vertically upwards (being hot and less dense) and the off-gases 115 are collected and directed through outlet vent 117. A cold cap 119 resides above the waste 101 in the melt chamber 105 and allows off-gas 115 and other products to migrate vertically upwards and vented through outlet vent 117. FIG. 1 also show supports 121 for calciner/vitrifier 100, which are structural supports.

Continuing discussing FIG. 1, the off-gas 115 produced is often very dangerous itself requiring major and significant processing subsystems for treatment of this off-gas 115 into less dangerous products. Note, such additional and similar processing subsystems for treatment of this off-gas 115 into less dangerous products are not needed in operations of embodiments of the current invention; because off-gases (e.g., 235a and/or 235b) from operation of embodiments of the current invention are intentionally directed to permeate/migrate into porous and permeable rock formations 207 proximate a top/upper region of human-made caverns 201 that are entirely located within deeply located geological formation 207. This off-gas 235b may remain captured in portions of rock formations 207 for geologic time periods of thousands of years (see e.g., FIG. 2).

In practice, the prior art technology taught in FIG. 1 was limited to a maximum depth of 19 feet below the Earth's surface 209. Further, the longest operating time period may be less than 150 to 500 hours for calciner/vitrifier 100. Under the published operating conditions and parameters, the total maximum throughput of waste is between 50 tons to 500 tons waste processed.

Embodiments of the current in-situ vitrification of waste materials inventions may provide significant advantages and improvements over the FIG. 1 calciner/vitrifier 100, including, but not limited to: treating significantly larger volumes of waste products; being capable of operating for significantly longer times; disposing of the vitrified waste products in safe deep underground locations; providing a simple treatment solution to off-gases (e.g., 235, 235a, and/or 235b); providing a safe deep underground location for (treated) off-gas 235b disposal; combinations thereof, and/or the like.

Figure 2:
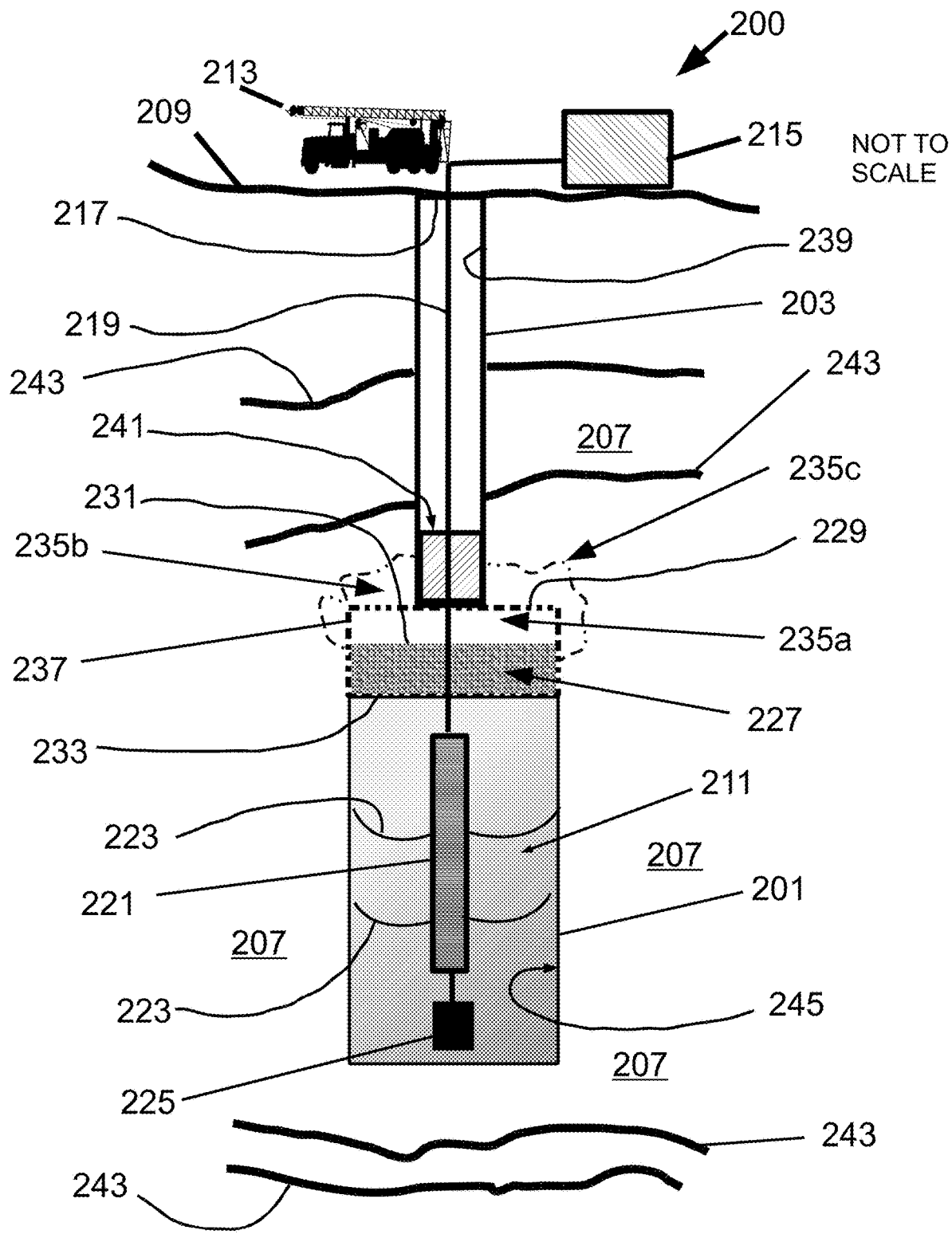
FIG. 2 may depict a vertical cross-sectional diagram of an in-situ geologically deeply located vitrification waste system as contemplated by embodiments of the present invention.

FIG. 2 may depict a vertical cross-sectional diagram of an in-situ geologically deeply located vitrification waste system 200 (system 200). In some embodiments, system 200 may comprise at least one human-made cavern 201, at least one wellbore 203, and at least one vitrification means. In some embodiments, human-made cavern 201 may be a vitrification chamber. In some embodiments, the given human-made cavern 201 may be located entirely within a deep geologic formation 207. In some embodiments, the given wellbore 203 may communicatively and physically link the at least one human-made cavern 201 to the Earth's surface 209. In some embodiments, waste 211 may be loaded from Earth's surface 209, through the at least one wellbore 203, and into the at least one human-made cavern 201. In some embodiments, portions of vitrification means (e.g., portions of cabling 219, heater 221, vanes/mixers 223, and weight 225) may be lowered from Earth's surface 209, through the at least one wellbore 203, and into the at least one human-made cavern 201, to be used to melt, liquify, and vitrify waste 211 that may within the at least one human-made cavern 201.

Continuing discussing FIG. 2, in some embodiments, waste 211 may be one or more of: radioactive material, radioactive waste, nuclear material, nuclear waste, high-level nuclear waste (HLW), low-level nuclear waste (LLW), depleted uranium products, $UF_6$, hazardous waste, dangerous waste, portions thereof, combinations thereof, and/or the like. In some embodiments, waste 211, prior to vitrification, may be in primarily solid form, such as, but not limited to, aggregates and/or granular forms. In some embodiments, during vitrification waste 211 may be referred to as "melt 211."

Continuing discussing FIG. 2, in some embodiments, melt 211 may be a primary material which contains nuclear waste products which have been vitrified according to embodiments of the present invention. In some embodiments, a composition of the melt 211 may be determined in advance, by exhaustive chemical and physical analysis to meet and/or to satisfy final requirements of a vitrified radioactive glass product. To those skilled in the relevant arts, these analyses are available and customary in the glass making industry. In some embodiments, a calculated quantity of waste material 211 may delivered into the given human-made cavern 201 from the Earth's surface 209 and through the wellbore 203. In some embodiments, waste material 211, which may be in aggregate, powder or granular form or combinations thereof, may be generally free-flowing in nature, and may accumulate inside the given human-made cavern 201 and around the heater device 221, surrounding and covering the heater device 221 and its centralizers 223 and reaching a calculated (predetermined) height in the given human-made cavern 201.

The prior art vitrification processes "batch process" relatively small volumes of waste/melt 101. In one example, a Direct Liquid Fed Ceramic Melt system with melter dimensions of 1.22 meter×0.86 meter×0.71 meter produced about 25 kilograms (kg) of melt 101 per hour. The volumetric capacity of that prior art melter was estimated at 744 liters of melt 101. Whereas and in contrast, the embodiments contemplated in this invention, based on the projected deep underground human-made cavern 201 dimensions, may provide for melt 211 volumes significantly greater than prior art levels. Based on the projected dimensions of the underground human-made cavern 201, the embodiments taught herein may process between 20,000 liters to 500,000 liters of melt 211 per underground human-made cavern 201. And such melt 211 processing may occur over a matter of days depending on the heater 221 capacity and electric energy deliverability from the Earth's surface 209. By comparison, a Russian process discussed in the prior art, produced 160 tons melt 101 over an 18-month period. There is a great (and long felt) need for embodiments which can process the very large volumes of high-level waste (radioactive waste) that is present worldwide today (2020).

Continuing discussing FIG. 2, in some embodiments, a given wellbore 203 may be drilled from site 217 on the Earth's surface 209 using rig 213. In some embodiments, a given wellbore 203 may run from Earth's surface 209 to deep geologic formation 207. In some embodiments, for most of a length of wellbore 203, that length may be substantially/mostly vertical, wherein vertical may be substantially parallel with a local gravitational field at site 217. In some embodiments, a distal/terminal end of wellbore 203 disposed away from Earth's surface 209 may connect and/to attached to the at least one human-made cavern 201. In some embodiments, wellbore 203 may be need to be formed first before forming the at least one human-made cavern 201. In some embodiments, the distal portions of wellbore 203 disposed away from 209 may be attached to one or more human-made caverns 201 (see e.g., U.S. utility patent 10807132 which is incorporated by reference).

Continuing discussing FIG. 2, in some embodiments, a given human-made cavern 201 may be a human-made subterranean cavern located entirely underground. In some embodiments, it may be desirable to locate, create, form, and/or build one or more human-made cavern(s) 201 entirely within deep geological formation(s) 207. In some embodiments, the given human-made cavern 201 may be entirely located within deep geologic formation 207. In some embodiments, the given human-made cavern 201 may be formed from underreaming operations from the distal/terminal end of a given wellbore 203 (see e.g., U.S. utility Pat. No. 10,807,132 which is incorporated by reference). In some embodiments, the underreaming equipment (as-is or modified) may be used from the oilfield industries (oilwell and drilling services industries). In some embodiments, human-made cavern 201 may be configured for receiving waste 211 therein. In some embodiments, human-made cavern 201 may be a vitrification chamber. In some embodiments, human-made cavern 201 may be configured for receiving portions of the vitrification means therein. In some embodiments, human-made cavern 201 may be configured for vitrification operations of waste 211 therein. In some embodiments, human-made cavern 201 may have a diameter from 30 inches to 120 inches, plus or minus 6 inches. In some embodiments, human-made cavern 201 may have a height (i.e., vertical length) of 100 feet to 10,000 feet plus or minus 50 feet. FIG. 2 may also show a side-wall 245 of the given human-made cavern 201. In some embodiments, side-wall 245 may be made of/from deep geologic formation 207. In some embodiments, side-wall 245 may comprise a lining if human-made cavern 201 may be lined.

Continuing discussing FIG. 2, in some embodiments, deep geologic formation 207 may be rock formation of predetermined characteristics and/or properties. In some embodiments, deep geologic formation 207 may be igneous rock, metamorphic rock, sedimentary rock, structural portions thereof, structural combinations thereof, and/or the like. In some embodiments, the selected deep geologic formation 207 may have desirable and/or required properties to contain vitrified radioactive waste material 211 over long-time intervals and may be able to minimize migration away from the human-made cavern(s) 201. In some embodiments, some of desired and/or required properties of deep geologic formation 207 may be demonstrated by petrophysical analysis (prior to selection). In some embodiments, deep geological formation 207 may have geologic properties that make storing nuclear waste materials within deep geological formation 207 relatively safe (and safer than prior art alternatives). For example, and without limiting the scope of the present invention, in some embodiments, deep geological formation 207 may have one or more of the following geologic properties: structural closure, stratigraphically varied, low porosity, low permeability, low water saturation, reasonable clay content, portions thereof, combinations thereof, and/or the like. In some embodiments, deep geologic formation 207 (also known as host rock) may be located substantially from about 2,000 feet to about 30,000 feet below Earth's surface 209, plus or minus 1,000 feet.

Note, even portions of deep geologic formation 207 near and/or proximate to human-made cavern 201 may be substantially unheated (i.e., not show a significant temperature increase), during vitrification, as the size and mass of deep geologic formation 207 far exceeds the size and mass of waste 211 within the given human-made cavern 201. That is, deep geologic formation 207 acts as a tremendous heat sink. Additionally, residual heating from the Earth's core greatly surpasses heating capacity from heater(s) 221, that is a temperature of deep geologic formation 207 is largely unchanged and largely dictated by the Earth's core.

Continuing discussing FIG. 2, in some embodiments, located on Earth's surface 209 may be at least one rig 213 and/or at least one power-source 215. In some embodiments, system 200 may further comprise the at least one rig 213 and/or the at least one power-source 215. In some embodiments, the at least one rig 213 and/or the at least one power-source 215 may be proximate, next to, adjacent to, reasonably close to, and/or the like with respect to site (wellhead) 217, wherein site (wellhead) 217 may be where the at least one wellbore 203 terminates at Earth's surface 209. In some embodiments, rig 213 may be used to: drill pilot wellbore(s) 203 at site(s) 217; drill out to form wellbore(s) 203; underream to form human-made cavern(s) 201; case wellbore(s) 203 with casing; load waste 211 into wellbore(s) 203 and/or human-made cavern(s) 201; load and/or withdrawn portions of the vitrification means into wellbore(s) 203 and/or human-made cavern(s) 201; initiate cold-cap 227; portions thereof; control vitrification within human-made cavern(s) 201; combinations thereof; and/or the like. In some embodiments, rig 213 may be a workover rig.

Continuing discussing FIG. 2, in some embodiments, the at least one power-source 215 may be configured to provide electrical power to portions of the vitrification means. In some embodiments, the at least one power-source 215 may be configured to electrically power at least some portions of the vitrification means. In some embodiments, the at least one power-source 215 may be operatively linked to (attached to) to portions of the vitrification means. In some embodiments, power-source 215 may be an electrical power generator. In some embodiments, power-source 215 may be an electrical power generator, using oil, gas, fuel, diesel, coal, hydroelectric, solar, wind, tidal, geothermal, nuclear, portions thereof, combinations thereof, and/or the like as a source for generating electrical power. In some embodiments, power-source 215 may be in electrical communication with a local and/or a regional electrical power distribution grid (e.g., from an electricity providing utility or the like). In some embodiments, power-source 215 may be an electrical power storage means/device. In some embodiments, power-source 215 may comprise one or more batteries and/or capacitors. In some embodiments, power-source 215 may be an electrical power delivery means/device. In some embodiments, power-source 215 may be located onsite (e.g., locally) with respect to site (wellhead) 217. In some embodiments, power-source 215 may be located remotely (not locally) with respect to site (wellhead) 217.

Continuing discussing FIG. 2, in some embodiments, the vitrification means may comprise at least one of: the at least one power-source 215; cabling 219; heater 221; vane/mixer 223; weight 225; portions thereof; combinations thereof; and/or the like. In some embodiments, the at least one power-source 215 may be operatively linked (attached to) cabling 219. In some embodiments, cabling 219 may be operatively linked (attached to): the at least one power-source 215; heater 221; vane/mixer 223; weight 225; portions thereof; combinations thereof; and/or the like. In some embodiments, cabling 219 may be mostly/substantially disposed between the at least one power-source 215 and heater 221. In some embodiments, when in use, cabling 219 may be mostly/substantially located within wellbore 203, with less of cabling 219 being located within human-made cavern 201. In some embodiments, cabling 219 may be configured to transmit and/or deliver electrical power/energy from power-source 215 to heater 221. In some embodiments, cabling 219 may be configured to communicate communication signals to and/or from heater 221. In some embodiments, heater 221 may be configured to get hot and heat up to vitrify waste 211 that may be touching and/or proximate to heater 221 exterior surfaces. In some embodiments, heater 221 may comprise one or more vanes/mixers 223. In some embodiments, vanes/mixers 223 may be attached to exterior surface(s) of a main body of heater 221. In some embodiments, vanes/mixers 223 may be configured to mix and/or stir waste 211 during vitrification to make the vitrification process more efficient. In some embodiments, vanes/mixers 223 may be one or more vanes and/or blades attached to exterior surface(s) of a main body of heater 221. In some embodiments, one or more weight(s) 225 (of predetermined mass) may be attached to a distal/terminal end of heater 221 disposed away from (opposite from) Earth's surface 209 and/or from wellbore 203. In some embodiments, weight(s) 225 may be configured to keep heater 221 pulled down and in a substantially vertical orientation during vitrification operations within human-made cavern 201.

In some embodiments, weight(s) 225 may provide continuous tension loading of cabling 219 and heater 221 at all times when these portions of the vitrification means are within wellbore 203 and human-made cavern 201. In some embodiments, weight(s) 225 may maintain cabling 219 (always) in tension for proper operational purposes in much the same way as "sinker rods" used below the sucker rods in pumping operations to maintain constant tension in sucker rods during oil well pumping field operations.

Continuing discussing FIG. 2, in some embodiments, within human-made cavern 201 may be at least one cold-cap 227. In some embodiments, system 200 may further comprise the at least one cold-cap 227. In some embodiments, the at least one human-made cavern 201 may comprise the at least one cold-cap 227. In some embodiments, cold-cap 227 may be located below a top 229 of human-made cavern 201, but above waste 211 within human-made cavern 201. In some embodiments, cold-cap 227 may develop above waste/melt material 211 within human-made cavern 201. In some embodiments, a top 231 of cold-cap 227 may not be physically touching top 229 of human-made cavern 201. In some embodiments, a bottom 233 of cold-cap 227 may be physically touching a top of waste 211. In some embodiments, cold-cap 227 may float above and on waste/melt material 211 within human-made cavern 201.

Continuing discussing FIG. 2, in some embodiments, cold-cap 227 may be to function as a thermal brake/insulation layer, thermally separating waste 211 (which may be hot and molten at times) from top 229 of human-made cavern 201. In some embodiments, there is significant decrease in temperature across cold-cap 227, from bottom 233 to top 231 (of cold-cap 227), as compared to higher temperatures in waste/melt material 211 below that of bottom 233, during and soon after vitrification. In some embodiments, a temperature of gas-cap 237 may be lower than higher temperatures in waste/melt material 211 below that of bottom 233, during and soon after vitrification, because of cold-cap 227 acting as an insulation layer (thermal break layer).

In one particular prior art dataset, a temperature range is reported from a high of 1,100 degrees Celsius (° C.) within the melt 101, to about 100 Celsius (° C.) at the top of the cold cap layer 119. Such a similar change in temperatures, or more, may be expected in the vitrification process occurring within the human-made cavern 201 of the present invention.

Continuing discussing FIG. 2, in some embodiments, this cold-cap 227 which may reside above waste/melt material 211, may behave as a layer through which gas and/or vapors may move and percolate from the liquid/solid melt material 211 in human-made cavern 201 during the vitrification process. In some embodiments, cold-cap 227 may have one or more chemicals, reagents, reactants, catalysts, and/or the like, i.e., VFA(s), to chemically convert dangerous and/or radioactive off-gases 235 from vitrification of waste 211 into other gases 235a and/or into products (e.g., solids as fixed-chemicals) that may be substantially/mostly retained within/on cold-cap 227, such that the off-gases 235a leaving cold-cap 227 may be safer. In some embodiments, cold-cap 227 may comprise one or more (predetermined) volatile fixing additives (VFAs). In some embodiments, VFAs (at least one VFA) may be added to the cold-cap 227. In some embodiments, bottom 231 and/or top 233 may comprise catalytic and/or reaction surfaces. In some embodiments, bottom 231 and/or top 233 may comprise catalytic and/or reaction surfaces of VFAs. In some embodiments, composition and properties of cold-cap 227 may be determined by analysis and preplanning before cold-cap 227 develops in the given wellbore 203 and in the given human-made cavern 201 above the waste/melt material 211. In some embodiments, cold-cap 227 may be a necessary and/or required element for proper and/or desirable operation of the vitrification processes contemplated herein; and to allow the management of volatiles (and/or gases, e.g., off-gas 235) that are produced in the vitrification process (using the vitrification means) and/or that are generated from nuclear operations (e.g., fission and/or nuclear decay). In some embodiments, most, if not all, chemical reactions between the nuclear waste volatiles 235 and their selective trapping reactants introduced into cold-cap 227, to manage those volatiles 235, may occur primarily (mostly) in and/or on cold-cap 227.

In some embodiments, cold-cap 227 may behave like a "fluidized bed reactor" (FBR), which is well known in the art, particularly when off-gas 235 may be generated during and shortly after vitrification and this off-gas 235 may be flowing up and into cold-cap 227, much like the fluid does in a FBR. In a FBR, multiple chemical reactions may be occurring back-to-back and/or simultaneously within that same FBR device (reactor) in which there is a vertical gradation from the bottom of the reactor system to the top. In some embodiments, the reacting materials in cold-cap 227 may exist in a mostly in a fluidized state.

See also FIG. 3A, FIG. 3B, and FIG. 3C, and their respective below discussions for additional details with respect to cold-cap 227.

Continuing discussing FIG. 2, in some embodiments, vitrification of waste/melt 211 below cold-cap 227 in human-made cavern 201 using the vitrification means may produce various off-gases 235; and/or off-gases 235 may also be produced from nuclear operations (e.g., fission and/or nuclear decay). In some embodiments, off-gases 235 being less dense than waste 211 may move vertically upwards within human-made cavern 201. In some embodiments, off-gases 235 may move vertically upwards through and into cold-cap 227. In some embodiments, off-gases 235 may move vertically upwards from bottom 233 to and through top 231 (of cold-cap 227). In some embodiments, off-gases 235a (post cold-cap 227 treatment) may fill a volume/space within an upper region of human-made cavern 201 disposed between top 233 (of cold-cap 227) and top 231 of human-made cavern 201, wherein this volume/space may be designated as gas-cap 237. In some embodiments, gas-cap 237 may be an upper region of human-made cavern 201, disposed between top 231 (of cold-cap 227) and top 229 (of human-made cavern 201). In some embodiments, off-gases 235b may migrate from gas-cap 237 and into portions of deep geologic formation 207 that are proximate to (adjacent to/next to) the upper region of human-made cavern 201. In some embodiments, off-gases 235b may also migrate into portions of deep geologic formation 207 that are proximate to (adjacent to/next to) the upper region of human-made cavern 201. Note over time, the volume of off-gas 235b in formation 207 may increase. Note over time, the leading-edge of off-gas 235c in formation 207 may continue to expand outwards further into deep geologic formation 207.

Note, reference numeral "235" may refer to volatiles/off gases from vitrification of waste 211 and/or from nuclear operations of waste 211 before and during cold-cap 227 treatment; whereas, reference numerals "235a" may refer to off gases post cold-cap 227 treatment; reference numeral "235b" may refer to off gases (also post cold-cap 227 treatment) in formation 207; and reference numeral "235c" may refer to the leading edge of the off gases (also post cold-cap 227 treatment) in formation 207.

Continuing discussing FIG. 2, in some embodiments, a gas zone of off-gases 235a may occur during the vitrification process above cold-cap 227 in gas-cap 237. In some embodiments, gas-cap 237 may be a void space or zone free of solid and/or liquid material. In some embodiments, gas-cap 237 may be filled with off-gas 235a (after treatment through cold-cap 227) because off-gas 235 (before cold-cap 227 treatment) may be produced during vitrification and may be vented through cold-cap 227 from the melt 211 as the melt constituents are heated and vitrified in the given human-made cavern 201. In some embodiments, this off-gas 235a (after treatment through cold-cap 227) may accumulate in gas-cap 237 of the human-made cavern 201 because of the density differences between off-gas 235 and the liquid melt 211. In some embodiments, as off-gas 235a (after treatment through cold-cap 227) accumulates in gas-cap 237, some of off-gas 235b (after treatment through cold-cap 227) may migrate out of top 229 and/or upper sides of human-made cavern 201 and into pore void/spaces of the rock formations 207 around and above human-made cavern 201. It is well known in the relevant arts (e.g., geology) that all sedimentary rocks have varying porosities and permeabilities; and even igneous rocks have fracture porosity and permeability; and as such off-gas 235b (after treatment through cold-cap 227) may migrate into these zones some distance into deep geologic formation 207, shown in FIG. 2 as another gas cap (separate and different from gas-cap 237) in deep geologic formation 207, identified in FIG. 2 with reference numerals 235b and 235c. Such gas caps in sedimentary and/or igneous rocks may accommodate large volumes of gas (large in comparison to amounts of waste 101 that prior art devices can handle). For example, and by comparison in oil fields, natural gas caps normally contain many millions of cubic feet of natural gas, thus the gas zone delineated by the leading edge 235c of off-gas 235b (after treatment through cold-cap 227) migrating into the formations 207 may accommodate a significant amount of off-gas 235b (after treatment through cold-cap 227) produced during the melt 211 vitrification process and subsequent cold-cap 227 treatment. In some embodiments, the deep underground formation(s) 207 may thus provide a secure disposal for the off-gas 235b (after treatment through cold-cap 227), some of which may later condense and remain trapped as condensate in the pore spaces of the rock formation(s) 207.

In some embodiments, vitrification of waste/melt 211 (and/or nuclear operations of waste 211, such as nuclear decay) may produce one or more of: at least one volatile chemical produced from nuclear operations and/or produced from vitrification of waste 211 within a vitrification chamber (e.g., human-made cavern 201); radioactive gases; radioactive volatiles; volatile cadmium (Cd); volatile cesium (Cs); volatile rhodium (Ru); volatile rhenium (Re); volatile molybdenum (Mo); volatile tellurium (Te); volatile antimony (Sb); volatile selenium (Se); volatile technetium (Tc); volatile carbon ($^{14}C$); volatile iodine ($^{129}I$); volatile tritium ($^{3}H$); isotopes thereof; portions thereof; combinations thereof; and/or the like.

In some embodiments, off-gas 235 may be one or more of the following gases: gas products and/or byproducts from nuclear operations (e.g., fission and/or nuclear decay) of waste 211; gas products and/or byproducts from vitrification of waste 211; at least one volatile chemical produced from nuclear operations and/or produced from vitrification of waste 211 within a vitrification chamber (e.g., human-made cavern 201); radioactive gases; radioactive volatiles; volatile cadmium (Cd); volatile cesium (Cs); volatile rhodium (Ru); volatile rhenium (Re); volatile molybdenum (Mo); volatile tellurium (Te); volatile antimony (Sb); volatile selenium (Se); volatile technetium (Tc); volatile carbon ($^{14}C$); volatile iodine ($^{129}I$); volatile tritium ($^{3}H$); isotopes thereof; portions thereof; combinations thereof; and/or the like.

In some embodiments, at least one volatile chemical produced from nuclear operations and/or produced from vitrification of waste 211 within a vitrification chamber (e.g., human-made cavern 201) may comprise one or more of: radioactive gases; radioactive volatiles; volatile cadmium (Cd); volatile cesium (Cs); volatile rhodium (Ru); volatile rhenium (Re); volatile molybdenum (Mo); volatile tellurium (Te); volatile antimony (Sb); volatile selenium (Se); volatile technetium (Tc); volatile carbon ($^{14}C$); volatile iodine ($^{129}I$); volatile tritium ($^{3}H$); isotopes thereof; portions thereof; combinations thereof; and/or the like. In some embodiments, the at least one volatile chemical may be a volatile chemical at temperatures present during steps 509, 511, 513, and/or 515 of method 500, see e.g., FIG. 5 and its below discussion.

Continuing discussing FIG. 2, in some embodiments, the at least one wellbore 203 may have at least some of its interior surfaces lined with casing(s) 239. In some embodiments, system 200 may further comprise casing(s) 239. In some embodiments, wellbore 203 may comprise casing(s) 239. In some embodiments, casing 239 may be at least one pipe or one or more pipes. In some embodiments, casing 239 may be metal, mostly/substantially metal, concrete, mostly/substantially metal, portions thereof, combinations thereof, and/or the like. In some embodiments, casing 239 may be steel piping.

Continuing discussing FIG. 2, in some embodiments, the at least one wellbore 203 may have at least one downhole sealing packer 241 placed at a terminal/distal end of wellbore 203, disposed away from Earth's surface 209, to seal-off that wellbore 203 from the otherwise attached human-made cavern 201. In some embodiments, downhole sealing packer 241 may be configured to seal-off wellbore 203. In some embodiments, downhole sealing packer 241 may be located at or near the bottom of the vertical wellbore 203, or at any suitable position along the vertical length of the wellbore 203. In some embodiments, downhole sealing packer 241 may be placed into the distal/terminal location within wellbore 203 using rig 213. In some embodiments, downhole sealing packer 241 may be placed into the distal/terminal location within wellbore 203 using rig 213, after waste 211 has been inserted into human-made cavern 201 and after cold-cap 227 has been placed into human-made cavern 201 above waste 211. In some embodiments, downhole sealing packer 241 may be implemented with a "Hydril" type packing system, well known to those in industry, which can seal around the power (heater) cabling 219 and any irregular object and thus prevent gases or liquids from travelling vertically up the wellbore 203. In some embodiments, downhole sealing packer 241 may be designed with an internal sliding mechanism which allows the power cabling 219 to be reciprocated through the downhole sealing packer 241 and provide vertical travel of up to three (3) feet or more while still sealing the wellbore 203 from gases or liquids flowing vertically upwards. In some embodiments, system 200 may further comprise the at least one downhole sealing packer 241. In some embodiments, the at least one wellbore 203 may comprise the at least one downhole sealing packer 241.

Note in FIG. 2, geological discontinuities and boundaries between distinct formations may be designated by reference numeral 243.

Figure 3A:
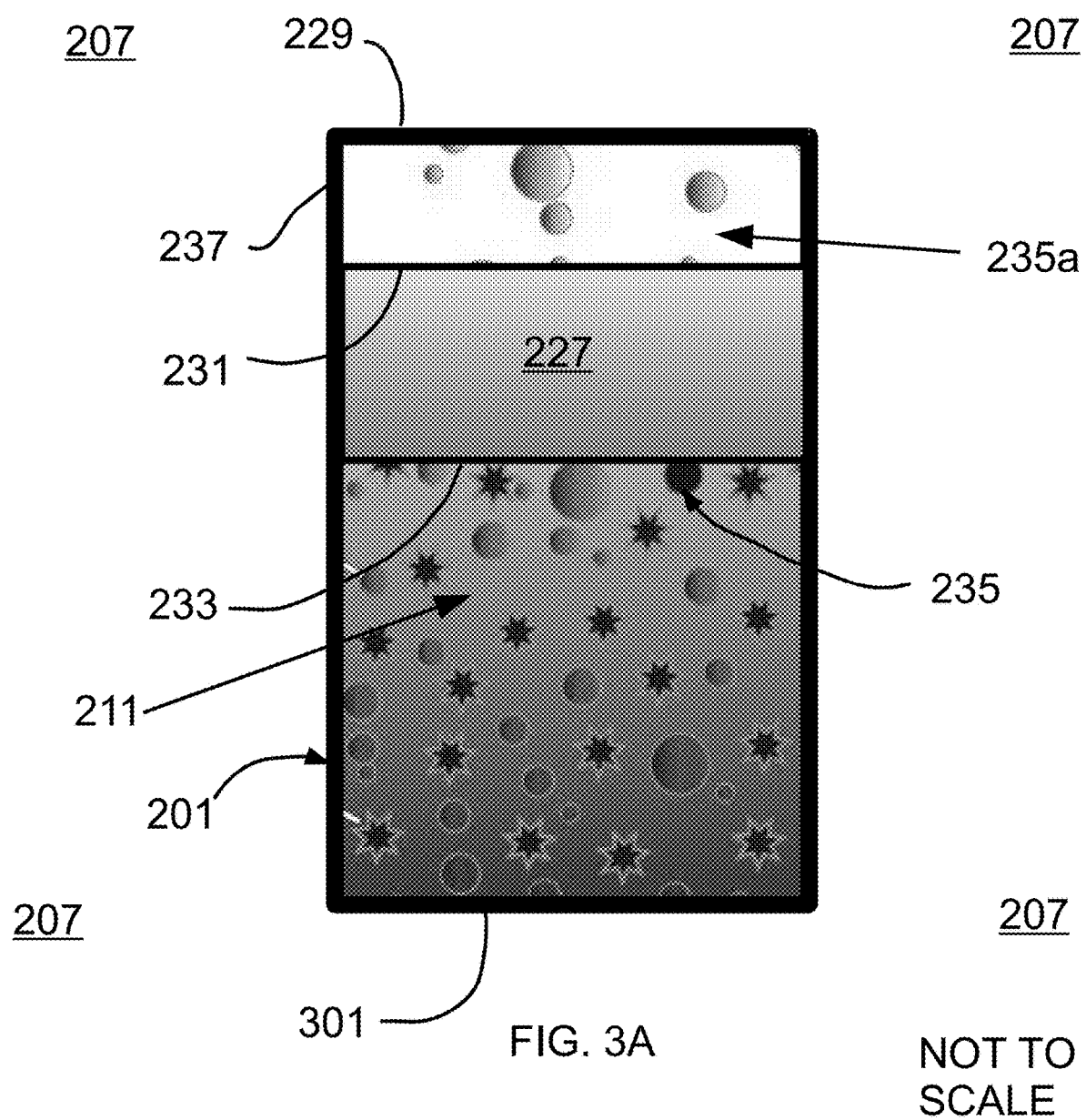
FIG. 3A may depict a cross-sectional block diagram through a length of a given human-made cavern (with waste/melt, a cold-cap, and a gas-cap shown therein).

FIG. 3A may depict a cross-sectional block diagram through a length of a given human-made cavern 201. Note, the vitrification means are omitted from FIG. 3A to better show various layers of the given human-made cavern 201. In some embodiments, with respect to the length of the given human-made cavern 201, from top 229 to a bottom 301, the given human-made cavern 201 may first have gas-cap 237 of off-gases 235a (after cold-cap 227 treatment); then there may be the cold-cap 227; then there may be waste/melt 211 (which may be in liquid and/or solid form); and lastly, bottom 301. In some embodiments, off-gases/volatiles 235 may be in human-made cavern 201, below and/or in cold-cap 227, but not above cold-cap 227 and not in gas-cap 237. In some embodiments, an interface between cold-cap 227 and waste/melt 211, e.g., at bottom 231, may be where chemical reactions between off-gases 235 (e.g., from vitrification and/or nuclear operations of waste 211) and cold-cap 227 first being to occur. In some embodiments, the interface between cold-cap 227 and waste/melt 211, e.g., at bottom 231, may be where most (and/or a majority) of chemical reactions occur between off-gases 235 and volatile fixing additives (VFAs) of cold-cap 227. In some embodiments, cold-cap 227 may be where most chemical reactions may occur with respect to treating off-gases 235 into safer species and which this invention teaches where the mechanisms for managing the dangerous volatiles 235 that are produced from vitrification (and/or from nuclear operations of waste 211) may be managed. Note, cold-cap 227 may also treat non-vitrification off gases 235 from waste 211.

Chemical absorption involves a chemical reaction between the substance being absorbed and the absorbing medium. In some cases, chemical absorption occurs in combination with physical absorption. Chemical absorption may depend upon the stoichiometry of the reaction and the concentration of the reactants.

Chemical adsorption, also known as chemisorption, on solid materials is achieved by substantial sharing of electrons between the surface of adsorbent and adsorbate to create a covalent or ionic bond. Chemisorption capacity may quantify the ability of a given absorbent to absorb the adsorbate material.

In some embodiments, the volatile 235 and/or gaseous compounds (constituents) to be managed by cold-cap 227 VFAs and/or other cold-cap 227 reagents may be one or more of the following: volatile cadmium (Cd); volatile cesium (Cs); volatile rhodium (Ru); volatile rhenium (Re); volatile molybdenum (Mo); volatile tellurium (Te); volatile antimony (Sb); volatile selenium (Se); volatile technetium (Tc); volatile carbon ($^{14}$C); volatile iodine ($^{129}$I); volatile tritium ($^3$H); portions thereof; combinations thereof; and/or the like. In some embodiments, volatile cadmium (Cd); volatile cesium (Cs); volatile rhodium (Ru); volatile rhenium (Re); volatile molybdenum (Mo); volatile tellurium (Te); volatile antimony (Sb); volatile selenium (Se); volatile technetium (Tc); volatile carbon ($^{14}$C); volatile iodine ($^{129}$I); volatile tritium ($^3$H); portions thereof; combinations thereof; and/or the like, may be produced from waste 211 and/or from vitrification of waste 211. In some embodiments, this list of volatiles 235 may be dangerous and/or radioactive. It may be desirable to treat such volatiles 235 to render them more safe and less dangerous (e.g., less radioactive).

Continuing discussing FIG. 3A, in some embodiments, a series of chemical reactions, occurring in and/or on cold-cap 227, may be implemented to trap, modify, and/or fix in cold-cap 227, the volatile elements and compounds 235 developed in the vitrification processes in the melt 211. In some embodiments, gas-cap 237 may be the region above cold-cap 227, in human-made cavern 201, in which non-condensing gases 235a (after treatment through cold-cap 227) may exist/accumulate. In some embodiments, the trapping, modification, and/or fixing of the gaseous wastes 235 containing volatile Cd, Cs, Ru, Re, Mo, Te, Sb, Se, Tc, $^{14}$C, $^{129}$I, $^3$H, portions thereof, combinations thereof, and/or the like, may occur in and/or on cold-cap 227, which may occur above and floats on top of the melt 211.

Figure 3C:
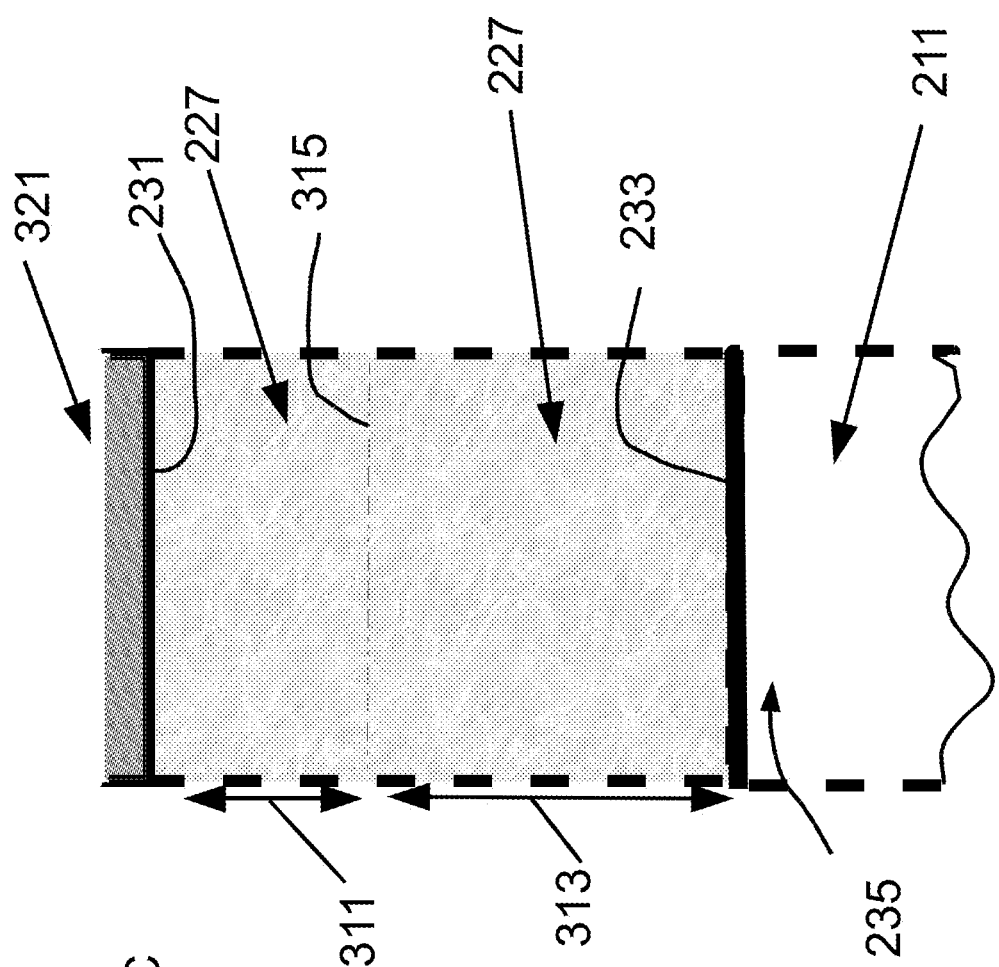
FIG. 3C may show an enlarged view of Detail 3C.
Figure 3B:
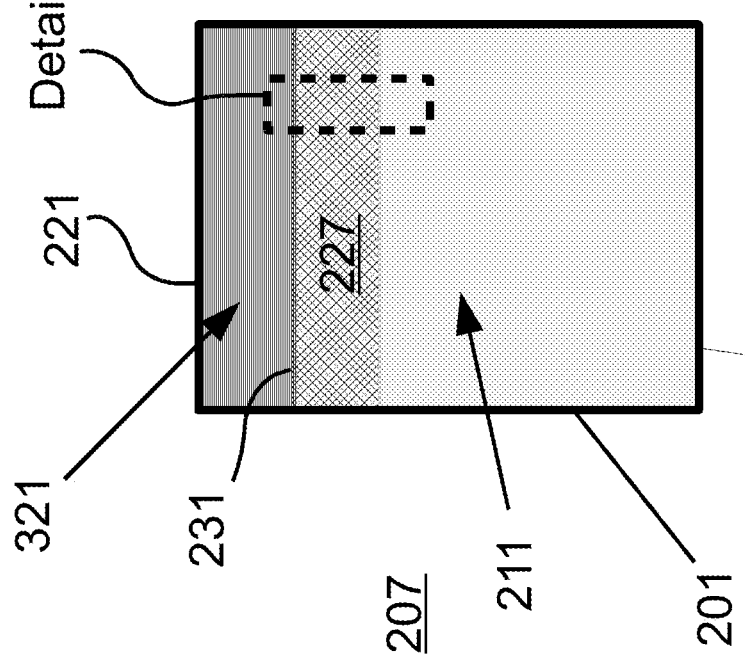
FIG. 3B may depict a cross-sectional block diagram through a length of a given human-made cavern (with waste/melt, a cold-cap, and a gas-cap shown therein)

FIG. 3B may depict a cross-sectional block diagram through a length of a given human-made cavern 201. And in FIG. 3B may be a region identified as Detail 3C. And enlarged view of Detail 3C is shown in FIG. 3C.

FIG. 3C may show an enlarged view of Detail 3C. FIG. 3C may show that cold-cap 227 may be vertically segregated into two zones, a cooler upper zone 311 and a warmer lower zone 313. In some embodiments, cooler upper zone 311 may be on top of warmer lower zone 313 (with respect to the vertical orientation). In some embodiments, at least some portions of cooler upper zone 311 may be in physical contact with at least some portions of warmer lower zone 313. In some embodiments, where cooler upper zone 311 meets warmer lower zone 313 may be designated as boundary layer 315. In some embodiments, at boundary layer 315, a bottom of cooler upper zone 311 physically contacts a top of warmer lower zone 313. In some embodiments, cooler upper zone 311 may be cooler than warmer lower zone 313 (e.g., during and shortly [e.g., hours to days] after vitrification). In some embodiments, a bottom of warmer lower zone 313 may be bottom 233 of cold-cap 227; thus, at least some portions of warmer lower zone 313 may be in physical contact with waste/melt 211. In some embodiments, a top of cooler upper zone 311 may be top 231 of cold-cap 227. In some embodiments, cold-cap 227 may be the localized area in which most chemical reactions (contemplated herein) may occur and which this invention teaches where the mechanisms for managing the volatiles 235 that are produced may be managed and/or controlled. In some embodiments, cold-cap 227 may behave like a (miniature) fluidized bed reactor (FBR) because cold-cap 227 may involve foaming and/or mixing of embedded cold-cap 227 solids and gaseous constituents 235. In some embodiments, the temperature distribution of cooler upper zone 311 and warmer lower zone 313 may be shown in FIG. 4.

Continuing discussing FIG. 3C, in some embodiments, an insulating blanket 321 may be located on top of (above) top 231 of cold-cap 227. In some embodiments, insulating blanket 321 may be in physical contact with top 231 of cold-cap 227. In some embodiments, insulating blanket 321 may be in physical contact with a top of cooler upper zone 311. In some embodiments, an insulated blanket 321 may be implemented above the cold-cap 227. In some embodiments, insulating blanket 321 may be located above cold-cap 227 and below gas-cap 237, within a given human-made cavern 201. In some embodiments, insulating blanket 321 may be inserted into place using rig 213 and wellbore 203. In some embodiments, insulating blanket 321 may be configured to thermally insulate regions below insulating blanket 321 (which may be warmer) from regions above insulating blanket 321 (which may be cooler). In some embodiments, insulating blanket 321 may be configured to thermally insulate cold-cap 227 and melt 211 (which may be warmer) from gas-cap 237 (which may be cooler). In some embodiments, insulating blanket 321 may be gas permeable.

In some embodiments, the insulative blanket 321 may comprise of commercially available silica aerogel powder/granules and/or similar type products. In some embodiments, the insulative blanket 321 may be several inches thick. In some embodiments, silica aerogel powder/granules and/or similar type products may provide the physical and thermal qualities for insulative blanket 321 because of low density and mass for these materials. Silica aerogel powder/granules and/or similar type products has been shown to have good thermal insulation performance. On account of silica aerogel powder/granules and/or similar type products nanoporous structure (1~100 nm), low density (3~250 kg/m3), low dielectric constant (1.1~2.5), low thermal conductivity (0.013~0.025 W/(m-k)), high porosity (80~99.8%), surface area (500~1000 m2/g) and other unique physical characteristics silica aerogel powder/granules and/or similar type products may provide a means for thermally insulating the melt 211 while still allowing some evolved gas permeation from the melt 211.

Figure 4:
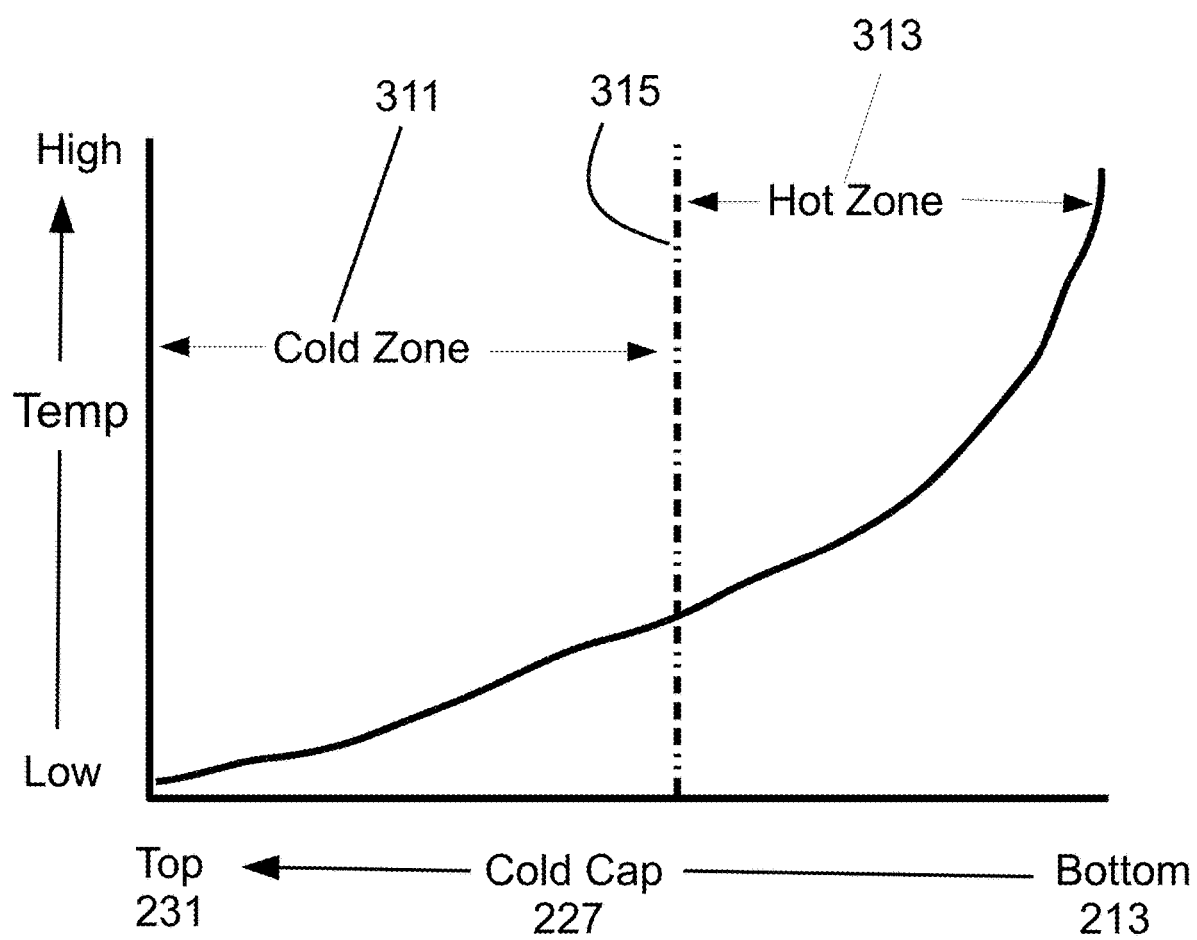
FIG. 4 may be a graph depicting the vertical temperature distribution in a cold-cap during (and shortly after) vitrification within a given deep human-made cavern.

FIG. 4 may be a graph depicting the temperature distribution in cold-cap 227 during (and shortly after) vitrification within the given deep human-made cavern 201. FIG. 4 may be considered to be a heat concentration profile. FIG. 4 may be shown with no dimensions. The y-axis is temperature and the x-axis are the vertical spatial relationships of cold-cap 227. FIG. 4 shows the variation in temperature according to different vertical levels in cold-cap 227. The variation in temperature may be a function of cold-cap 227 size, dimensions, materials, the chemical reactions occurring in and on cold-cap 227, and the heating within melt 211 inside the given human-made cavern 201.

Figure 5:
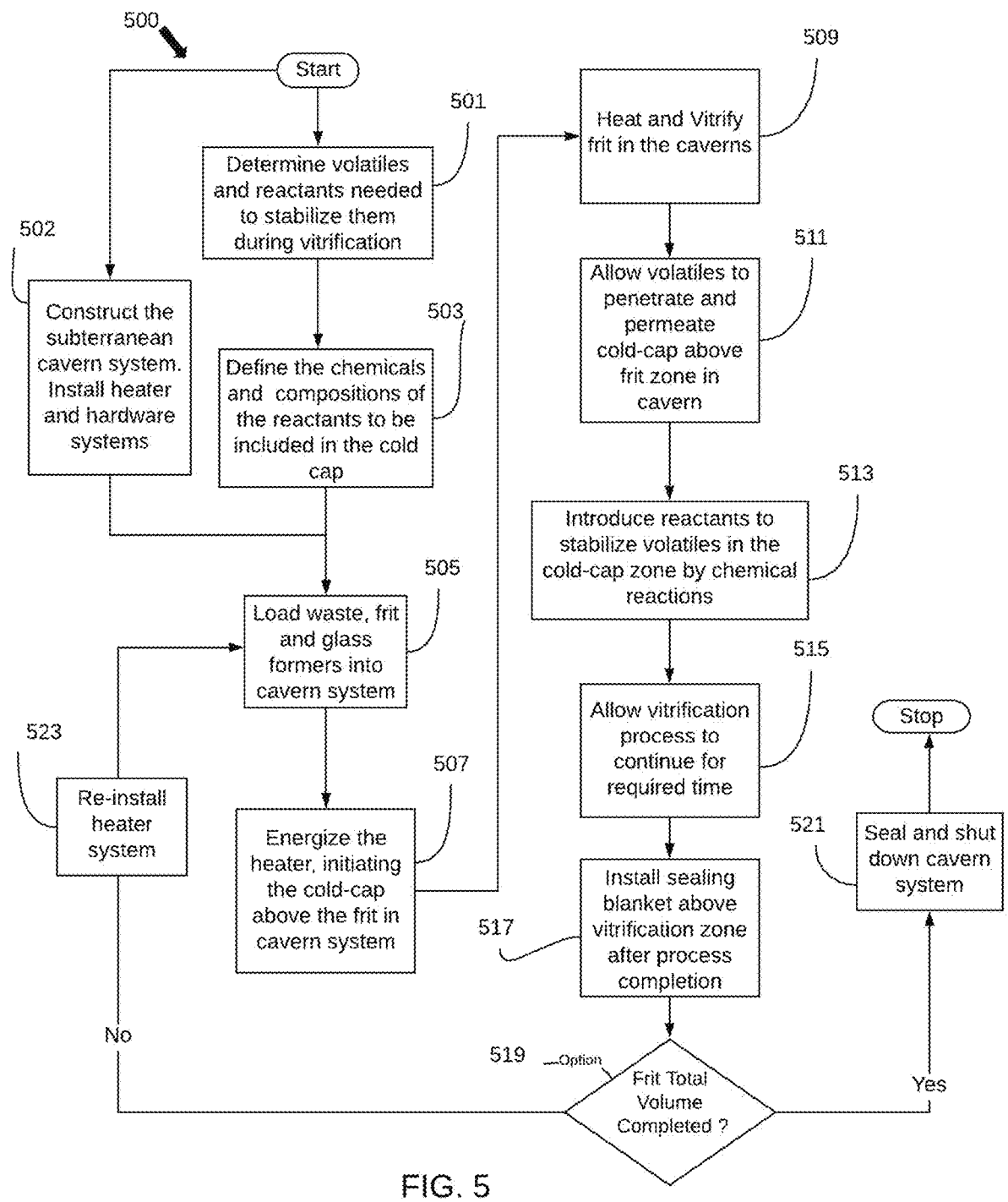
FIG. 5 may depict at least some steps, as a flowchart, of a method for managing (dangerous) volatiles produced in vitrification of (high-level) waste materials in deep underground human-made cavern(s).

FIG. 5 may depict a flowchart. FIG. 5 may depict method 500. In some embodiments, method 500 may be a method for managing at least one volatile chemical 235 produced from nuclear operations and/or produced from vitrification of waste 211 within a vitrification chamber (human-made cavern 201). In some embodiments, method 500 may be a method of managing the volatiles 235 produced in the vitrification of (high-level) waste materials 211 (and/or produced from nuclear operations of waste 211) in deep underground human-made cavern(s) 201. In some embodiments, method 500 may be a method of in-situ vitrification of waste 211 within geologically deep human-made cavern(s) 201. In some embodiments, method 500 may be a method of constructing a deep human-made cavern 201 to contain waste/melt 211. In some embodiments, method 500 may be a method of defining, determining, and/or selecting the chemical compositions (chemicals) of the reactants needed to fix volatiles 235 produced in the vitrification process (and/or produced from nuclear operations). In some embodiments, method 500 may be a method of loading waste 211 into a given human-made cavern 201. In some embodiments, method 500 may be a method of initiating cold-cap 227 above the waste/melt 211 in the given human-made cavern 201. In some embodiments, method 500 may be a method of converting, modifying, fixing, and/or trapping the volatiles 235 in and/or on cold-cap 227 as such volatiles 235 leave melt 211 during the vitrification process in the given human-made cavern 201. In some embodiments, method 500 may be a method of allowing the vitrification and volatile fixing process(es) to continue for a (predetermined) duration in the given human-made cavern 201. In some embodiments, method 500 may be a method of sealing the given human-made cavern 201 and sealing and shutting down the wellbore system 203 at the end of the vitrification and volatiles fixing processes.

Continuing discussing FIG. 5, in some embodiments, method 500 may comprise at least one (or one or more) of the following steps: 501, 502, 503, 505, 507, 509, 511, 513, 515, 517, 519, 521, and 523. In some embodiments, method 500 may be begin with step 501 and/or with step 502. In some embodiments, method 500 may be begin with another step (such as, but not limited to, step 503 and/or 505). In some embodiments, at least one such step may be optional or skipped. In some embodiments, some such steps may be executed out of numerical order, with respect to the steps reference numerals.

Continuing discussing FIG. 5, in some embodiments, step 501 may be a step of determining what volatiles 235 are likely to be produced from vitrification of waste 211 (and/or from nuclear operation of waste 211). In some embodiments, step 501 may be a step of analyzing and/or examining the radioactive waste 211 to be filled in step 505 to determine identification of the at least one volatile chemical 235 that may produced from nuclear operations of waste 211 (e.g., from decay and/or fission) and/or that may be produced from vitrification of waste 211. In some embodiments, step 501 may include a process of analytically and/or empirically assessing the waste 211 material to determine the types of volatiles 235 that may be produced during the melt (vitrification) process and/or from fission/nuclear decay of waste 211. In some embodiments, this analyzing and/or examining of the radioactive waste 211 and the identification determination of the at least one volatile chemical 235 may utilize one or more of the following techniques: chemical reaction simulation software running on a computer; empirical analysis; chemical analysis of a sample of the radioactive waste and resulting products from a small-scale laboratory vitrification batch test run; portions thereof; combinations thereof; and/or the like. In some embodiments, step 501 may include determining and/or identifying the volatile fixing additives (VFAs) needed in the cold-cap 227 to fix these determined, identified, and/or known volatiles 235. In some embodiments, given: the type of waste 211, amount of waste 211 in a given human-made cavern 201, size and shape of given human-made cavern 201, heater 221 properties, vitrification operating temperatures, vitrification operating duration, and/or the like, it will be known what and how much volatiles 235 may be produced. It will be known by the system, the method, and/or by the personnel carrying out, monitoring, and/or managing the system, the method, and/or the steps. In some embodiments, step 501 may progress into step 503.

Continuing discussing FIG. 5, in some embodiments, given the volatiles 235 that are now determined and/or known for a planned vitrification process, step 503 may be a step of determining what chemicals to introduce into the cold-cap 227 for purposes of reacting with those determined volatiles 235, to render those volatiles 235 safer; by reacting, converting, modifying, fixing, immobilizing, and/or trapping the identified dangerous (and often radioactive) volatiles 235 with such chemical(s) embedded in and/or on cold-cap 227. In some embodiments, step 503 may be a computational, analytical, and/or simulation step. In some embodiments, in step 503 the specific VFAs may be determined (defined) (according to outputs of step 501) and the VFAs chemical compositions, reaction ratios, stoichiometry data are calculated a priori, such that the precise quantities of VFAs may be added to cold-cap 227 to ensure total fixation of the volatiles 235. In some embodiments, step 503 may define the chemical "cocktail" that may be added to the cold-cap 227 during the vitrification processes occurring below cold-cap 227. In actual practice, the weight percent of VFA may vary and excess VFA quantities may be actually utilized to ensure complete trapping or fixing of the expected volatiles 235. In some embodiments, an excess quantity of 10% to 20% by weight of the VFA may be adequate to ensure 100% trapping of each specific expected volatile 235. In some embodiments, step 503 may progress into step 505.

Continuing discussing FIG. 5, in some embodiments, step 502 may be a step of constructing a system of deeply located human-made cavern(s) 201. Recall, each such human-made cavern 201 may be located entirely within deep geologic formation 207; and each such human-made cavern 201 may be accessed via at least one wellbore 203 that runs from the given human-made cavern 201 to the wellhead 217 on the Earth's surface 209. In some embodiments, step 502 may further comprise loading/installing at least portions of the vitrification means into the constructed human-made cavern(s) 201. In some embodiments, step 502 may further comprise loading/installing portions of cabling 219, heater(s) 221, vane/mixer(s) 223, and/or weight(s) 225 into the constructed human-made cavern(s) 201. In some embodiments, step 502 may include the field processes in which drilling operations and process are implemented using surface rig 213, to drill a wellbore 203 into a deep formation 207, then to ream out at least one human-made cavern 201 for containing waste 211, portions of the vitrification means, and necessary hardware packers equipment to vitrify the waste 211. In some embodiments, step 502 operations may occur in parallel or sequentially to step 501 (i.e., either before, during, and/or after step 501). Thus, step 502 may be a step of constructing and/or installing necessary infrastructure and/or hardware for executing much of method 500. In some embodiments, step 502 may progress into step 505.

Continuing discussing FIG. 5, in some embodiments, step 505 may be a step of loading waste 211 (and frit material(s) and/or glass former(s)) into the human-made cavern(s) 201 from step 502. In step 505, in some embodiments, the waste material 211 and glass formers are loaded into the given human-made cavern 201 from the surface 209 via the wellbore 203. The amounts of waste 211 (and frit material(s) and/or glass former(s)) loaded into the human-made cavern(s) 201, may be predetermined based on: the human-made cavern(s) 201 shape and size; on the shape and size of the portions of cabling 219, heater(s) 221, vane/mixer(s) 223, and/or weight(s) 225; on the computed or expected shape and size of cold-cap 227; on the shape and size of insulating blanket 321; and/or on the shape and size of gas-cap 237. In some embodiments, such loading of step 505 may be carried at least in part by using rig 213; and/or using various pumping means working complimentary with rig 213. In some embodiments, step 505 may progress into step 507.

Continuing discussing FIG. 5, in some embodiments, step 507 may be a step of energizing the heater system and thereby initiating the development of the cold-cap 227 (that was determined in step 503) in the given human-made cavern(s) 201, and above the waste 211, frit, and/or glass former materials already within the given human-made cavern(s) 201 (from step 505). In step 507, in some embodiments, the cold-cap 227 zone may develop above the waste material 211 within the given human-made cavern 201. In some embodiments, the rate of development and size of the cold-cap 227 may depend on the ratio of heat flux from the melt 211 below and the vertical heat loss from the top 231 of the cold-cap 227 zone. In some embodiments, step 507 may further be a step of installing insulating blanket 321 above cold-cap 227 within the given human-made cavern(s) 201; however, insulating blanket 321 may alternatively be installed in step 517 in some embodiments; and other embodiments may not use insulating blanket 321. In some embodiments, step 507 may progress into step 509.

Continuing discussing FIG. 5, in some embodiments, step 509 may be a step of vitrifying the waste 211, frit, and/or glass former materials within the given human-made cavern(s) 201 using the vitrification means. In some embodiments, in step 509, the waste material 211 may be heated as discussed under FIG. 2, and the vitrification process begins in the given human-made cavern 201. In some embodiments, step 509 may run at predetermined temperatures. In some embodiments, step 509 may run at predetermined duration(s). In some embodiments, execution of step 509 may be timed. In some embodiments, execution of step 509 may occur until a minimum temperature is measured for a minimum time. In some embodiments, at least a portion of: human-made cavern 201, cabling 219, heater 221, vanes/mixers 223, weight 225, cold-cap 227, insulating blanket 321, waste 211, frit material, glass former material, portions thereof, combinations thereof, and/or the like, may be fitted with one or more temperature sensor(s) that may be configured to communicate sensed temperatures back to Earth's surface 209. In some embodiments, step 509 will produce volatiles 235, some of which may be radioactive and/or dangerous. In some embodiments, step 509 may progress into step 511.

Continuing discussing FIG. 5, in some embodiments, step 511 may be a step of the produced volatiles 235 from step 509 penetrating and/or permeating into and/or through cold-cap 227. In some embodiments, cold-cap 227 may be gas and/or volatile permeable. In some embodiments, in step 511, the waste material 211 now heated to a melt by the portion of the vitrification means (e.g., heater 221), may allow the volatiles 235 to migrate vertically upwards from the melt 211 and into cold-cap 227, permeating cold-cap 227 as shown in FIG. 3A. In some embodiments, steps 509 and 511 may overlap and/or occur at least partially concurrently. In some embodiments, once step 509 has ceased, step 511 may still continue to occur. In some embodiments, step 511 may progress into step 513.

Continuing discussing FIG. 5, in some embodiments, step 513 may be a step of introducing (adding) at least one VFA into the cold-cap 227. In some embodiment, step 513 may permit reacting of the produced volatiles 235 with the at least one VFA in and/or of cold-cap 227 to render at least some of the dangerous volatiles 235 into safer gases/volatiles that exit cold-cap 227, by the predetermined chemical(s) (e.g., at least one VFA) in and/or on cold-cap 227 reacting with, converting, modifying, fixing, and/or trapping at least some of these dangerous volatiles 235. In some embodiments, at least some of the dangerous volatiles 235 may be retained, essentially as solids, as part of cold-cap 227. In some embodiments, step 513 may be considered an important step in this novel application, since the chemical reactions upon the volatiles 235 may occur in this step 513 wherein the VFAs interact with the volatiles 235 and create new solid products which may remain in cold-cap 227. In some embodiments, the desired output chemical from reacting a given/predetermined volatile 235 with a given/predetermined VFA may be termed, "at least one fixed-chemical" or a "fixed-chemical." In some embodiments, these "fixed-chemicals" may be retained in and/or the cold-cap 227. These "fixed-chemicals" may be described in the below Examples 1 through 12 (after the FIG. 6 discussion) and shown in numerated chemical reactions equations of those examples. In some embodiments, these "fixed-chemicals" may comprise one or more radioactive elements, isotopes, and/or compounds that may be at least mostly retained in and/or on cold-cap 227.

In some embodiments, steps 509, 511, and 513 may overlap and/or occur at least partially concurrently. In some embodiments, once step 509 has ceased, step 513 may still continue to occur. In some embodiments, step 513 may occur before or during steps 509, 511, and/or step 515. In some embodiments, step 513 may occur before or during step 515. In some embodiments, step 513 may progress into step 515.

Continuing discussing FIG. 5, in some embodiments, step 515 may be a step of the vitrification process continuing until completion. In some embodiments, completion of vitrification may be determined by monitoring vitrification temperatures and/or by timing. In some embodiments, in step 515 the vitrification process (started in step 509) and volatiles 235 stabilization process of step 513 may continue for a pre-determined duration (or until a minimum temperature is reached for a minimum time) to allow complete fixing and/or trapping of the volatiles 235 on and/or in cold-cap 227. In some embodiments, step 511 and/or 513 may continue during step 515 and for some time after step 515. In some embodiments, the temperatures within human-made cavern 201 during vitrification (e.g., steps 509 and/or 515) may be between 1,000 degrees Celsius (° C.) and 1,500 degrees Celsius (° C.). In some embodiments, a given batch of vitrification (e.g., during steps 509 and/or 515) within a given human-made cavern 201 may occur from ten (10) days to ninety (90) days. In some embodiments, step 515 may progress into step 517.

Continuing discussing FIG. 5, in some embodiments, step 517 may be a step of installing insulating blanket 321 above waste/melt 211 within the given human-made cavern 201. In some embodiments, step 517 may be a step of installing insulating blanket 321 above cold-cap 227 within the given human-made cavern 201. In some embodiments, such installing of step 517 may be carried at least in part by using rig 213. In some embodiments, such installing of step 517 may be facilitated by using various pumping/loading means working complimentary with rig 213. In some embodiments, in step 517, the waste/melt material 211 and cold-cap 227 material may be sealed or capped off, by installing a blanket of material 321 above cold-cap 227. In some embodiments, sealing blanket 321 may separate the current batch of completed vitrified material 211 from newer batches of waste material 211 that may be implemented at a later time in that very same human-made cavern 201. In some embodiments, step 517 may progress into step 519.

Continuing discussing FIG. 5, in some embodiments, step 519 may be a step of determining if a given human-made cavern 201 may be sufficiently full with vitrified waste 211, at least one cold-cap 227, and at least one gas-cap 237. In some embodiments, this determination may be made because a size and volume of the given human-made cavern 201 and amounts of waste 211 and VFAs added into the given human-made cavern 201 are all known parameters (known by the system and/or known by the operator(s)). This may entail determining if the vitrification process has completed or is ready for completion; and/or whether a sufficient quantity (mass) of waste 211 was vitrified in that given human-made cavern 201. In some embodiments, if step 519 determines the given human-made cavern 201 is full, including with sufficient vitrified waste 211, at least one cold-cap 227, and at least one gas-cap 237; then step 519 may progress into step 521. In some embodiments, if step 519 determines more waste 211 may be added and vitrified within the given human-made cavern 201, then step 519 may progress into step 523. In some embodiments, in step 519 may be a decision step. In some embodiments, if all the intended waste material 211 (frit) has been processed then the process may move to step 521 in which the wellbore 203 and/or human-made cavern(s) 201 are sealed and may be permanently plugged. In some embodiments, if on the other hand, additional frit material 211 is needed to be processed by vitrification, step 519 may lead to step 523 in which portions of the vitrification means may be installed into an upper portion (section) of the human-made cavern(s) 201 that already have some vitrified waste 211 therein; wherein operations then may restart at step 505 to load additional quantities of waste 211 into that human-made cavern 201 from Earth's surface 209.

In some embodiments, from step 505, method 500 may iterate various steps, such as, but not limited to steps 505, 507, 509, 511, 513, 515, 517 to step 519 until the total disposal of all waste material 211 and the vitrification process is complete with respect to one or more human-made cavern(s) 201. Step 521 may be the last operational phase in which the wellbore 203 and the cavern 201 are sealed and shut down completely.

Continuing discussing FIG. 5, in some embodiments, step 521 may be a step of shutting down and/or sealing off the applicable wellbore(s) 203 and/or their respective full human-made-cavern(s) 201. In some embodiments, step 521 may be a step of shutting down the disposal process in the deep human-made cavern(s) 201. In some embodiments, step 521 may include a means of sealing the deep human-made cavern(s) 201 and/or the wellbore(s) 203, by using downhole plugs or packers 241, by cement plugging of the vertical wellbore(s) 203. In some embodiments, step 521 may include a means of safety marking the location (e.g., around site(s) 217) of the wellbore(s) 203 on the Earth's surface 209. In some embodiments, such sealing may be accomplished by placing one or more downhole sealing packer(s) 241 into appropriate location(s) within the relevant wellbore(s) 203 (see e.g., FIG. 2). In some embodiments, such sealing may be facilitated by use of rig 213.

Continuing discussing FIG. 5, in some embodiments, step 523 may be a step of loading/installing at least portions of the vitrification means into the human-made cavern(s) 201 that may already some vitrified waste 211 therein. In some embodiments, step 523 may comprise loading/installing portions of cabling 219, heater(s) 221, vane/mixer(s) 223, and/or weight(s) 225 into the human-made cavern(s) 201 that may already some vitrified waste 211 therein. In some embodiments, step 523 may progress into step 505.

In some embodiments, method 500 comprise: step 505 of filling the vitrification chamber (e.g., human-made cavern 201) with a predetermined quantity of radioactive waste 211; step 502 of installing at least a portion of a heater system (e.g., heater 221, vane/mixer 223, weight 225, and portions of cabling 219) to the vitrification chamber, wherein the heater system may be configured to vitrify the predetermined quantity of the radioactive waste 211 within the vitrification chamber; step 507 of energizing the heating system to heat the predetermined quantity of the radioactive waste 211 within the vitrification chamber; step 507 of initiating a cold-cap 227 vertically above the predetermined quantity of radioactive waste 211 that is within the vitrification chamber; wherein vertical in this context is substantially parallel with a direction of pull of a gravitational field at the vitrification chamber; wherein the cold-cap 227 thermally insulates a closest portion vertically above the cold-cap 227 from portions of the vitrification chamber below the cold-cap 227; step 513 of adding at least one predetermined volatile-fixing-additive (VFA) to the cold-cap 227, wherein the at least one predetermined volatile-fixing-additive (VFA) may be configured to convert most of the at least one volatile chemical 235 into at least one fixed-chemical; wherein the at least one fixed-chemical is retained in/on the cold-cap 227; and at least step 515 of vitrifying the predetermined quantity of the radioactive waste 211 within the vitrification chamber using the heater system resulting in a glass-waste-product 211 and resulting in at least some of the at least one volatile chemical 235, most of which reacts with the at least one VFA to produce the at least one fixed-chemical.

In some embodiments, method 500 prior to steps 505, 502, 507, 513, and 515 may first comprise step 501 of examining the radioactive waste 211 to be filled in the step 505 to determine identification of the at least one volatile chemical 235 that may be associated with radioactive decay of the particular type of radioactive waste 211 and/or that may be produced from vitrifying that particular type of radioactive waste 211. In some embodiments, the examination of the radioactive waste 211 and the identification determination of the at least one volatile chemical 235 may utilize one or more of the following techniques: chemical reaction simulation software running on a computer, empirical analysis; chemical analysis of a sample of the radioactive waste 211 and resulting products from a small-scale laboratory vitrification batch test run; combinations thereof; and/or the like. In some embodiments, after the identification of the at least one volatile chemical 235, the method may further comprise step 503 of determining and identifying the at least one predetermined volatile-fixing-additive (VFA) that may be suitable for reacting with that VFA to produce the at least one fixed-chemical.

Figure 6:
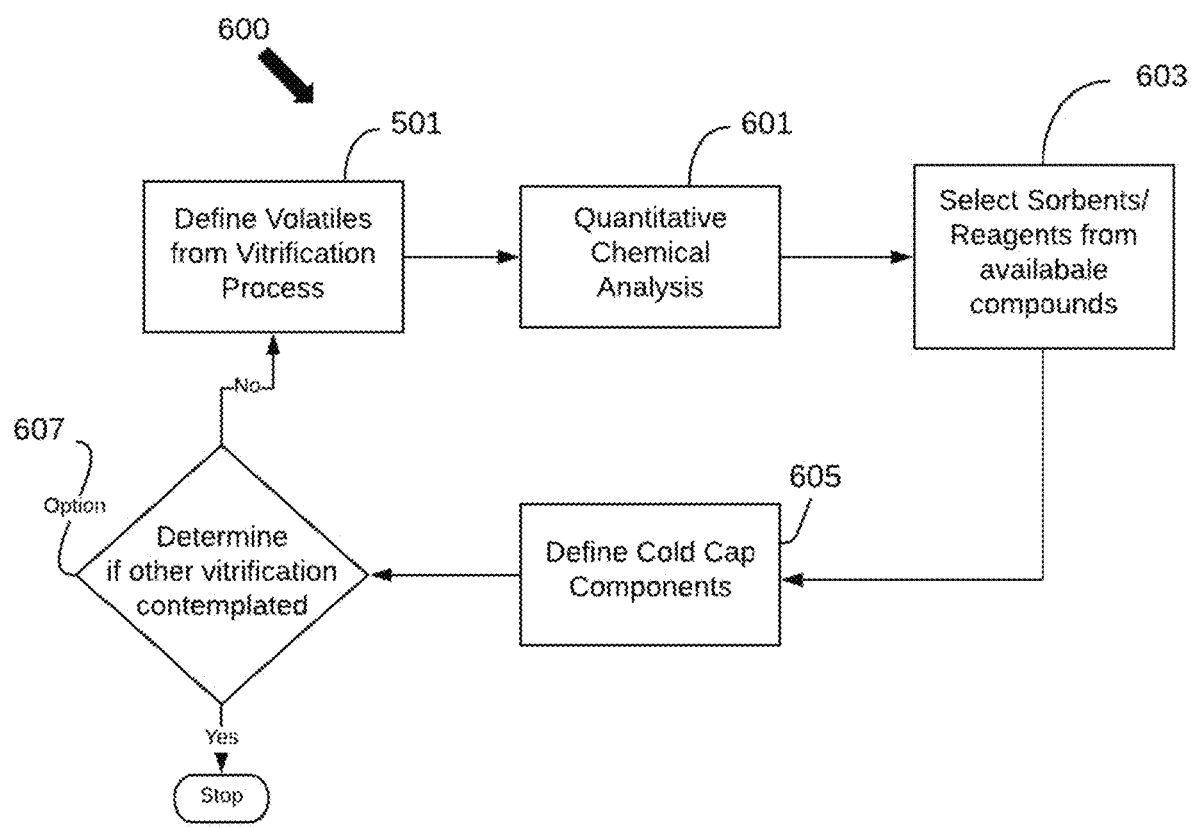
FIG. 6 may depict a flowchart of steps in a method of analyzing, simulating, and/or modelling chemistry and chemical operations for managing volatiles produced in the vitrification of (high-level) waste materials in deep underground human-made cavern(s).

FIG. 6 may depict a flowchart. FIG. 6 may depict method 600. In some embodiments, method 600 may be a method of analyzing, simulating, and/or modelling the chemistry and chemical operations that may be necessary for managing the volatiles 235 produced in the vitrification of (high-level) waste materials 211 in deep underground human-made cavern(s) 201 (and/or of volatiles 235 produced from nuclear operations of waste 211). In some embodiments method 600 may be a method of determining the compositions of glass forming additives, the temperatures of operations, the timing of the processes, and the time temperature profiles for annealing of the melt 211 to meet requirements/desires for a finished vitrified waste glass product 211. In some embodiments method 600 may be a method of quantitative chemical analysis of the vitrification process. In some embodiments method 600 may be a method of selecting the chemical reagents, adsorbents, absorbents, and/or the like which may be needed for each volatile product 235 which has to be fixed in the cold-cap 227. In some embodiments, these cold-cap 227 reagents may become the volatile fixing additives (VFAs) of cold-cap 227. In some embodiments method 600 may be method of defining the cold-cap 227 chemistry, its size, its composition and/or other parameters for fixing the volatiles 235 derived from the melt 211 in the vitrification process.

Continuing discussing FIG. 6, in some embodiments, method 600 may comprise at least one (or one or more) of the following steps: 501, 601, 603, 605, and 607. In some embodiments, at least one such step may be optional or skipped. In some embodiments, some such steps may be executed out of numerical order, with respect to the steps reference numerals.

Continuing discussing FIG. 6, in some embodiments, step 501 may be substantially as described above for method 500, except in method 600, step 501 may progress into step 601. In some embodiments, step 501 may be a step of defining the specific volatiles 235 which may be produced during the vitrification process (and/or produced from nuclear operations on waste 211). In some embodiments, step 501 may be implemented at any time prior to field operations (e.g., cavern 201 underreaming) (such as, but not limited to, step 502 and/or other method 500 steps beside step 501 and 503). In some embodiments, step 501 may be executed in a laboratory type environment and/or under well controlled conditions. In some embodiments, an output of step 501 may be a working list of volatiles 235 expected/anticipated to be produced by the contemplated waste 211 vitrification process(es).

Continuing discussing FIG. 6, in some embodiments, step 601 may be a step of quantitative chemical analysis. In some embodiments, step 601 may be a step of analytically and/or empirically determining the weight fractions of each of the VFAs needed to accomplish fixation of the volatiles 235 in the planned cold-cap 227. In some embodiments, step 601 may be implemented remotely from the operations site (e.g., remote from site(s) 217). In some embodiments, step 601 may progress into step 603.

Continuing discussing FIG. 6, in some embodiments, step 603 may be a step of selecting sorbent(s) and/or reagent(s) for use in cold-cap 227. In some embodiments, step 603 may include a selection process for VFAs needed to accomplish fixation of the volatiles 235 in the cold-cap 227. In some embodiments, this selection process in step 603 may be based on several factors. In some embodiments, since many different reagents may be available for fixation, it may be necessary to make a selective decision based on economics, ease of operation, availability and other conditions related to the specific reagent. In some embodiments, step 603 may progress into step 605.

Continuing discussing FIG. 6, in some embodiments, step 605 may be a step of defining/determining cold-cap 227 component(s). In some embodiments, step 605 may define the expected size, volume, weight, weight percentages, and/or composition of the various VFA materials in cold-cap 227. In some embodiments, this definitional step 605 may be important. In some embodiments, this step 605 may allow the variations of operations and the results that may occur during vitrification to be catalogued and modified or repeated later as additional cycles of vitrification are enacted in the given human-made cavern 201. In some embodiments, step 605 may progress into step 607.

Continuing discussing FIG. 6, in some embodiments, step 607 may be a step of determining if different and/or new vitrification processes might also be contemplated for implementation. In some embodiments, if a different and/or a new vitrification process is to be implemented (e.g., in same human-made cavern 201 or a different human-made cavern 201), the step 607 may return to step 501 for execution of method 600 again for the new/different vitrification process. In some embodiments, if no additional vitrification is contemplated, the method 600 stops at step 607. In some embodiments, step 607 may progress into step 501 or method 600 stops at step 607.

Decontamination is regarded as the process of removing or neutralizing contaminants. In this application, the term "decontamination factor" (hereinafter, "DF"), is simply the radiation level prior to application of the cold-cap 227 treatment process divided by the radiation level after the process is employed.

The present invention may be explained in greater detail in the following twelve (12) non-limiting examples for the treatment of various volatiles 235 produced during the vitrification processes and/or outgassed from nuclear reactions (e.g., fission and/or decay). These examples may detail chemical reactions, specific weights of reagents, stoichiometry, tabular data and/or operational conditions which may occur in the cold-cap 227 during (and after) the vitrification process of nuclear waste 211. In some embodiments, volatiles 235 (produced during the vitrification of radioactive waste 211 and/or from nuclear operations of waste 211) (i.e., the at least one volatile chemical 235) may comprise one or more of the following volatiles: iodine, cesium, carbon, tritium, technetium, cadmium, molybdenum, selenium, tellurium, rhenium, ruthenium, rhodium, portions thereof, isotopes thereof, radioactive isotopes thereof, compounds thereof, molecules thereof, derivatives thereof, combinations thereof, and/or the like. One or more VFAs may react with such volatiles 235 to produce at least one fixed-chemical, wherein the fixed-chemical may include the radioactive chemical species that are then retained within and/or on the cold-cap 227.

In the figures with the chemical reaction equations (e.g., FIG. 7 through FIG. 16), a first line of a chemical reaction equation shown is a balanced chemical reaction with standard/typical chemical symbols referring to each reaction constituent, followed in a next line by the molar quantities (mol) of each chemical constituent, and lastly followed in a next line by each chemical weight in grams (g) of each chemical constituent.

In the chemical reaction equations VFAs and volatiles 235 may be on the left side of the given chemical reaction equation and produced fixed-chemical(s) may be on the right side of the given chemical reaction equation.

Example 1—Managing Volatile Iodine

In some embodiments, cold-cap 227 may comprise one or more predetermined chemical species (reagent(s)/VFA(s)) configured to manage, treat, fix, and/or contain volatile iodine, such that managed, treated, fixed, and/or contained formerly volatile iodine is retained substantially (mostly) within and/or on cold-cap 227. Note, at least some volatile iodine may be radioactive.

A variety of solid absorbents have been examined and developed over the past two decades. Of the solid absorbents for iodine removal, a promising approach is to use an inorganic absorbent in which a stable iodine compound is formed. Silver form absorbents were selected as the most promising materials tested at high temperature conditions. Most silver-form solid absorbents comprise silver in a range of fifteen (15) to twenty (20) percent by weight (wt %) of the silver containing solid absorbent. Such a solid containing solid absorbent may be used in commercial scale processes for controlling volatile iodine.

The following Table 1, compares the operational efficiency of various absorbents for controlling iodine under varying conditions of temperature, indicating chemisorption capacity, NOx resistance, decontamination factors, and the commercial applicability of the absorbent.

TABLE 1

Comparison of performance of solid sorbents/reagents for removing radio-iodine.

| Absorbent | Optimal Temperature (° C.) | Chemisorption capacity (mg-$I_2$/g) | Decontamination factor | NOx resistance | Commercial application |
|---|---|---|---|---|---|
| AgX | 150 | 500~250 | $10^2$~$10^5$ | Weak | Commercial |
| AgZ | 150 | 170~500 | $10^2$~$10^5$ | Strong | Lab-scale |
| Ag°Z | 150 | 170~500 | $10^2$~$10^5$ | Strong | Commercial |
| AC-6120 | 130 | 140 | $10^2$~$10^5$ | Strong | Commercial |
| AgA$^a$ | 130 | 100~500 | $10^2$~$10^5$ | Strong | Lab-scale |
| CdX | 150 | 5~10 | — | Weak | Lab-scale |
| PbX | 150 | 5 | — | Weak | Commercial |
| 13X | <50 | 5 | $10^5$ | Weak | Lab-scale |

See also FIG. 17 for Table 1.

The AgX, AgZ compounds noted in Table 1 are silver based absorbents fabricated using a silver ion exchange zeolite system. The range in weight of silver in AgX is from 15% to 20%. The AgZ compounds are established by silver ion-exchange using a support matrix of a faujasite and mordenite. AC-6120 is made by impregnating silver nitrate ($AgNO_3$) on a silica gel matrix.

For example, with respect to Table 1, AgX-10 with about ten (10) wt % of silver and that may use a radioactive methyl iodide tracer, showed that removal efficiency of radio-iodine at 150 degrees Celsius (° C.) was over 99.9%.

Table 2 may show a limited comparison of unit process characteristics for trapping iodine species using AgX, Ag°Z, and AC-6120.

TABLE 2

Comparison of solid absorbent/reagents for removing radio-iodine.

| Absorbent Parameters | AgX | Ag°Z | AC-6120 |
|---|---|---|---|
| Relative humidity (R. H) | Slight effect up to 70% R. H. | Slight effect up to 70% R. H. | Slight effect up to 70% R. H. |
| NO gas | Uncertain | No influence up to 2% NO conc. | Uncertain |
| $NO_2$ gas | Negative effect on DF | No influence up to 2% NO conc. | Protection function of Ag oxidation |
| $CO_2$ gas | Negligible | Negligible | Negligible |
| Temperature | Optimal temperature of 150° C. | Optimal temperature of 150° C.~500° C. | Optimal temperature of 150° C. |
| Effecting impurity | Dodecane, $H_2S$ | Dodecane, H2S | Negligible |
| Column material | Stainless steel | Stainless steel | Stainless steel |
| Applicability to voloxidation | Applicable Advantage: high Iodine loading capacity | Suitable Disadvantage: high absorbent cost | Applicable Advantage: low absorbent cost |

See also FIG. 18 for Table 2.

The following chemical equations may illustrate chemical reactions involved in iodine interactions with the silver reagents:

$$3I_2 (g) + 6AgNO_3 (s) \rightarrow 4AgI (s) + 2AgIO_3 (s) + 6NO_2 \quad \text{(Eq. 1)}$$

$$CH_3I (g) + AgNO_3 (s) \rightarrow CH_3NO_3 (g) + AgI (s) \quad \text{(Eq. 2)}$$

$$I_2 (g) + 2Ag (s) \rightarrow 2AgI (s) \quad \text{(Eq. 3)}$$

$$2CH_3I (g) + 2H_2O (g) + 2Ag (s) \rightarrow 2AgI (s) + 2CH_3OH (g) + H_2 (g) \quad \text{(Eq. 4)}$$

In some embodiments, the silver iodine complexed formed in chemical equations (1) through (4) may be solid and/or substantially non-volatile. In some embodiments, the silver iodine complexed formed in chemical equations (1) through (4) may be substantially retained within and/or on cold-cap 227.

In some embodiments, chemical equation (1), (2), (3), (4), or the like, may be occurring in and/or on cold-cap 227.

In some embodiments, the chemical species (e.g., reagent and/or VFA) of cold-cap 227 for managing, treating, fixing, and/or containing volatile iodine 235 may be one or more of: silver; silver nitrate (e.g., $AgNO_3$); a silver compound from Table 1; a silver compound from Table 2; a silver containing absorbent; silver compounds; silver chloride (AgCl); silver iodide (AgI); silver hydroxide (AgOH); an absorbent with silver from a silver ion zeolite exchange system; a silver compound made from using silver ion exchange on a support matrix of faujasite and mordenite; a silica gel matrix impregnated with silver nitrate; a silver containing absorbent; portions thereof; combinations thereof; and/or the like.

In some embodiments, the weight fraction of the specific chemical species (reagents/VFAs) applied in the cold-cap 227 relative to the expected weight of produced volatile iodine material may vary from 76% to 134% depending on the selected chemical species (reagents/VFAs) material.

Example 2—Managing Volatile Cesium

In some embodiments, cold-cap 227 may comprise one or more predetermined chemical species (reagent(s)/VFA(s)) configured to manage, treat, fix, and/or contain volatile cesium, such that managed, treated, fixed, and/or contained formerly volatile cesium is retained substantially (mostly) within and/or on cold-cap 227. Note, at least some volatile cesium may be radioactive (e.g., $^{137}Cs$).

Cesium, as a semi-volatile fission gas, may be a major concern because of its half-life of 30.2 years (e.g., $^{137}Cs$ has a half-life of 30.2 years) and its intensive gamma radiation. Cesium may exist in the form of solid chemical compounds such as Cs, CsI, $Cs_2UO_3$. $Cs_2UO_4$, and $Cs_2MoO_4$ depending on Oxygen/Metal (O/M) ratio in spent nuclear fuel. Cesium may also exist in various volatile and/or gaseous forms such as, but not limited to, Cs, $Cs_2O$, CsI, and/or CsOH (e.g., in air, steam, and/or hydrogen conditions). Cesium monoxide ($Cs_2O$) is one of the chemical forms of cesium that could be present in waste operations, such as waste vitrification. Cesium monoxide vaporizes at 250 degrees Celsius (° C.) and tends to decompose into cesium metal and cesium peroxide ($Cs_2O_2$) at the temperature greater than 400 degrees Celsius (° C.). On exposing to dry air, $Cs_2O$ rapidly forms a mixture of $Cs_2O_2$ and $CsO_2$. However, a major chemical form that may be released from spent nuclear fuel in steam conditions is cesium iodide (CsI).

In some embodiments, a chemical fixation method using aluminosilicates materials such as, but not limited to, metakaolin ($Al_2O_3.2SiO_2$), bentonite ($Al_2O_3.4SiO_2.6H_2O$), and/or pyrophyllite ($Al_2O_3.4SiO_2.H_2O$) may be used to manage the volatile cesium. Cesium oxide is readily incorporated into aluminosilicates compounds, and the resulting materials are stable. Very detailed chemical reactions that may immobilize cesium from the vapor phase may be represented by the following chemical reaction equations (5)-(7), (9), (11), and/or (13). Chemical reaction equations (8), (10), and (12) may show initial reactions that may lead into chemical reactions (9), (11), and (13), respectively.

$$Cs_2O + Al_2O_3.2SiO_2 \rightarrow 2CsAlSiO_4 (s) \quad \text{(Eq. 5)}$$

$$Cs_2O + Al_2O_3.4SiO_2 \rightarrow 2CsAlSi_2O_6 (s) \quad \text{(Eq. 6)}$$

$$Cs_2O + Al_2O_3.10SiO_2 \rightarrow 2CsAlSi_5O_{12} (s) \quad \text{(Eq. 7)}$$

The reaction of $Cs_2O$ with aluminosilicate ($Al_2O_3.4SiO_2$) under air conditions may be used for cesium fixation as given in equations (5) to (7).

$$Cs_2SiO_3(amorphous) + O_2 (g) \rightarrow Cs_2O (g) + SiO_2(amorphous) + O_2 (g) \quad \text{(Eq. 8)}$$

$$Cs_2O (g) + Al_2O_2.4SiO_2 (s) \rightarrow 2CsAlSi_2O_2 (s) \quad \text{(Eq. 9)}$$

$$2CsI + \tfrac{1}{2}O_2 (g) \rightarrow Cs_2O (g) + I_2 (g) \quad \text{(Eq. 10)}$$

$$Cs_2O (g) + Al_2O_3.4SiO_2 (s) \rightarrow 2CsAlSi_2O_6 (s) \quad \text{(Eq. 11)}$$

$$2CsOH + O_2 (g) \rightarrow Cs_2O (g) + H_2O (g) + O_2 (g) \quad \text{(Eq. 12)}$$

$$Cs_2O (g) + Al_2O_2.4SiO_2 (s) \rightarrow 2CsAlSi_2O_2 (s) \quad \text{(Eq. 13)}$$

The following Table 3 compares the operational efficiency of methods using Clay material absorbents and Fly Ash absorbent for cesium trapping under various operating conditions.

TABLE 3

Comparison of fixation (trapping) methods for cesium.

| | Clay materials | Fly Ash |
|---|---|---|
| Description | Metakaolin, bentonite, pyrophyllite | Fly Ash |
| Reaction | Chemical adsorption | Chemical adsorption |
| Advantages | Formation of $CsAlSiO_4$, pollucite ($CsAlSi_2O_6$) and/or $CsAlSi_5O_{12}$ | Formation of pollucite Good thermal stability Good manufacturability Very cheap material cost |
| Disadvantages | High operation temperature (>450° C.) Difficult to form Dispersion of powder High pressure drop | High operation temperature (>450° C.) |
| D. F | 100 | 1,000 |
| State of development | Lab-scale (Non-active test) | Lab-scale (radioactive test) |

See also FIG. 19 for Table 3.

In some embodiments, the chemical species (e.g., reagent and/or VFA) of cold-cap 227 for managing, treating, fixing, and/or containing volatile cesium may be one or more of: metakaolin ($Al_2O_3.2SiO_2$), bentonite ($Al_2O_3.4SiO_2.6H_2O$), pyrophyllite ($Al_2O_3.4SiO_2.H_2O$), clay, Fly Ash, aluminosilicates and oxygen, absorbent, portions thereof, combinations thereof, and/or the like.

In some embodiments, the weight fraction of the specific rea the chemical species (e.g., reagent and/or VFA) implemented in/on the cold-cap 227 relative to the expected weight of produced volatile cesium material may vary from 79% to 250% depending on the selected chemical species (e.g., reagent and/or VFA) material.

Example 3—Managing Volatile Carbon

In some embodiments, cold-cap 227 may comprise one or more predetermined chemical species (reagent(s)/VFA(s)) configured to manage, treat, fix, and/or contain volatile carbon, such that managed, treated, fixed, and/or contained formerly volatile carbon is retained substantially (mostly) within and/or on cold-cap 227. Note, at least some volatile carbon may be radioactive (e.g., carbon-14 [$^{14}C$]).

In nuclear waste operations systems, $^{14}C$ is present as a mixture of carbon dioxide ($CO_2$), carbon monoxide (CO), and/or hydrocarbons with relative fractions dependent on the chemistry prevalent in the specific system. A large portion of the $^{14}C$ in gas exists as hydrocarbons, mainly methane, whereas in other cases the $^{14}C$ in the gas may exist predominantly as $CO_2$ and/or CO.

The selection of a specific process for the capture and retention of $CO_2$ from a gaseous stream depends on the volume of gas to be treated, the concentration of $CO_2$ in the gas stream, the composition of the gas stream and the desired final waste form. The capture of $CO_2$ by fixed bed adsorption using molecular sieves would require a pre-absorption step to dry the feed gas, removing essentially all the water. A widely used molecular sieve that effectively removes $CO_2$ is a sodium zeolite absorber.

Natural mordenite, hydrogenated mordenite, and/or modified hydrogenated mordenite NaX may perform well for the removal of $^{14}CO_2$ from dissolver off-gases. Modification of hydrogenated mordenite by sodium hydroxide (NaOH) may result in a larger adsorption capacity compared with the other absorbents. An absorbance capacity was found to decrease in the presence of 1% NOx.

The following chemical reaction equations may illustrate at least some of the very detailed reactions involved in carbon management in volatiles from vitrification processes.

$$2NaOH+CO_2 \rightarrow Na_2CO_3+H_2O \quad \text{(Eq. 14)}$$

In some embodiments, reaction of $CO_2$ with magnesium at 600° C. may be used for $^{14}C$ fixation.

$$^{14}CO_2+2Mg \rightarrow 2MgO+^{14}C \quad \text{(Eq. 15)}$$

The solid carbon product in equation (15) is expected to be stable and suitable for direct immobilization and disposal.

A number of absorbents, belonging to the group I (alkali metal) and group II (alkaline earth) hydroxides, may remove $CO_2$ effectively from gas streams. These chemical species may comprise: ascarite (NaOH on asbestos), $LiOH.H_2O$, $Ca(OH)_2$, $Ba(OH)_2$, soda lime (NaOH—$Ca(OH)_2$ mixtures), and/or baralyme ($Ca(OH)_2.Ba(OH)_2$ mixtures).

$$Ca(OH)_2+CO_2 \rightarrow CaCO_3+H_2O \quad \text{(Eq. 16)}$$

Absorption of carbon dioxide ($CO_2$) by scrubbing with a caustic aqueous solution is a familiar industrial process that may be used herein.

$$2NaOH+CO_2 \rightarrow Na_2CO_3+H_2O \quad \text{(Eq. 17)}$$

$$Na_2CO_3+Ca(OH)_2 \rightarrow 2NaOH+CaCO_3 \quad \text{(Eq. 18)}$$

In some embodiments, the chemical species (e.g., reagent and/or VFA) of cold-cap 227 for managing, treating, fixing, and/or containing volatile carbon may be one or more of: sodium hydroxides, calcium hydroxides, magnesium, alkali metal hydroxides, alkaline earth hydroxides, caustic powders, caustic pellets, caustic aqueous solution, ascarite (NaOH on asbestos), $LiOH.H_2O$, $Ca(OH)_2$, $Ba(OH)_2$, soda lime (NaOH—$Ca(OH)_2$ mixtures), baralyme ($Ca(OH)_2.Ba(OH)_2$ mixtures), sodium zeolite absorber, natural mordenite, hydrogenated mordenite, modified hydrogenated mordenite, absorbent, portions thereof, combinations thereof, and/or the like.

In some embodiments, the weight fraction of the specific chemical species (e.g., reagent and/or VFA) implemented in the cold-cap 227 relative to the expected weight of produced volatile carbon material may vary from 109% to 182% depending on the selected chemical species (e.g., reagent and/or VFA) material.

Example 4—Managing Volatile Tritium

In some embodiments, cold-cap 227 may comprise one or more predetermined chemical species (reagent(s)/VFA(s)) configured to manage, treat, fix, and/or contain volatile tritium, such that managed, treated, fixed, and/or contained formerly volatile tritium is retained substantially (mostly) within and/or on cold-cap 227. Note, at least some volatile hydrogen may be radioactive (e.g., tritium [T]).

Spontaneous fission of uranium and thorium may contribute small quantities of tritium (T). Tritium may be formed within nuclear reactor fuels, both light water reactors and liquid metal breeder reactors by ternary fission. Tritium decays with a half-life of 12.33 years.

Tritium oxidation may proceed through the reactions show below in chemical reaction equations (19) and (20), both of which may result in tritium species that may be volatile and/or gaseous.

$$T_2 + \tfrac{1}{2}O_2 \rightarrow T_2O \quad \text{(Eq. 19)}$$

$$T_2 + H_2O \rightarrow HTO + HT \quad \text{(Eq. 20)}$$

In some embodiments, the tritium adsorbent chemical species (reagent(s)/VFA(s)) of the present invention may be a tritium adsorbent which traps tritium from tritium-containing water and may comprise hydrogen and/or lithium containing manganese oxide(s) having a spinel crystal structure. In some embodiments, this tritium adsorbent to which tritium is adsorbed may be subjected to an acid treatment to elute and recover the tritium from the tritium adsorbent.

The adsorption mechanism of tritium by the tritium adsorbent of the present embodiment may be considered to be based on the adsorption reaction of the tritium ion ($^3T^+$) to the present adsorbent and the adsorption of tritium ion ($^3T^+$) generated from the oxidation reaction ($OT^- \rightarrow {}^3T^+ + 2e^- + (\tfrac{1}{2})O_2$) of a hydroxide ion ($OT^-$) containing tritium which takes place on the surface of the present adsorbent which contains manganese oxide exhibiting high oxidizing power as a main component. In general, the degree of dissociation of the water molecule is significantly low, and thus tritium in water is mostly present as water molecules ($T_2O$, THO) but not as ions. The present adsorbent promotes the dissociation reaction.

It is considered that the present tritium adsorbent adsorb the tritium ion in water based on the ion exchange reactions represented by the following chemical reaction equations (21), (22), and (23). Chemical reaction equations (21) and (22) represent a reaction using hydrogen-containing manganese oxide ($H_xMn_2O_4$) having a spinel crystal structure as the tritium adsorbent, and chemical reaction equation (23) represents a reaction using lithium-containing manganese oxide ($Li_xMn_2O_4$) having a spinel crystal structure as the tritium adsorbent.

$$H_xMn_2O_4 + yT^+ \rightarrow H_{x-y}T_yMn_2O_4 + yH^+ \quad \text{(Eq. 21)}$$

$$H_xMn_2O_4 + yOT^- \rightarrow H_{x-y}T_yMn_2O_4 + yH^+ + y(2e^-) + y(\tfrac{1}{2}O_2) \quad \text{(Eq. 22)}$$

$$Li_xMn_2O_4 + yT^+ \rightarrow H_{x-y}T_yMn_2O_4 + yLi^+ \quad \text{(Eq. 23)}$$

In some embodiments, the chemical species (e.g., reagent and/or VFA) of cold-cap 227 for managing, treating, fixing, and/or containing volatile tritium may be one or more of: hydrogen containing manganese oxide(s) having a spinel crystal structure, hydrogen-containing manganese oxide ($H_xMn_2O_4$) having a spinel crystal structure, lithium containing manganese oxide(s) having a spinel crystal structure, lithium-containing manganese oxide ($Li_xMn_2O_4$) having a spinel crystal structure, absorbent, portions thereof, combinations thereof, and/or the like.

In some embodiments, the weight fraction of the specific chemical species (e.g., reagent and/or VFA) implemented in the cold-cap 227 relative to the expected weight of produced volatile tritium material may vary from 926% to 6259% depending on the selected chemical species (e.g., reagent and/or VFA) material.

Example 5—Managing Volatile Technetium

In some embodiments, cold-cap 227 may comprise one or more predetermined chemical species (reagent(s)/VFA(s)) configured to manage, treat, fix, and/or contain volatile technetium, such that managed, treated, fixed, and/or contained formerly volatile technetium is retained substantially (mostly) within and/or on cold-cap 227.

The radioactive technetium product from nuclear operations may be $Tc_2O_7$. Radioactive technetium is a long-term radiation hazard because of its long half-life (2.13×10⁵yr). In high temperature processes, it is possible to volatilize technetium Tc oxides. The most stable oxide, $Tc_2O_7$, has a melting point of 119.5 degrees Celsius (° C.) and a boiling point of 311 degrees Celsius (° C.). Technetium dioxide sublimates at temperature above 900 degrees Celsius (° C.) and decomposes into Tc and $Tc_2O_7$ at temperatures above 1,100 degrees Celsius (° C.).

The technetium oxide(s) may be fixed by a chemical fixation method using alkaline earth metal carbonates (e.g., calcium carbonate ($CaCO_3$), barium carbonate ($BaCO_3$), and/or strontium carbonate ($SrCO_3$)) and/or using alkaline earth metal oxides (e.g., calcium oxide (CaO), barium oxide (BaO), and strontium oxide (SrO)). See for example the below chemical reaction equations (24) to (27):

$$CaO + Tc_2O_7 \rightarrow Ca(TcO_4)_2 \quad \text{(Eq. 24)}$$

$$BaO + Tc_2O_7 \rightarrow Ba(TcO_4)_2 \quad \text{(Eq. 25)}$$

$$3BaO + Tc_2O_7 \rightarrow Ba_3(TcO_5)_2 \quad \text{(Eq. 26)}$$

$$SrO + Tc_2O_7 \rightarrow Sr(TcO_4)_2 \quad \text{(Eq. 27)}$$

The following Table 4 compares the trapping methods for the volatile technetium.

TABLE 4

Comparison of trapping methods for technetium.

| | Adsorption on Solids |
|---|---|
| Description | By chemical reaction between gas and solid absorbent (Y, Ca, Ba, and Sr) at over 600° C. |
| Advantages | Formation of stable chemical compounds and good thermal stability |
| Disadvantages | Discontinuous operation |
| Development Status | Lab Scale |
| Remarks | ERERC, US - Most promising: under development at KAERI |

See also FIG. 20 for Table 4.

In some embodiments, the chemical species (e.g., reagent and/or VFA) of cold-cap 227 for managing, treating, fixing, and/or containing volatile technetium may be one or more of: alkaline earth metal carbonates, calcium carbonate ($CaCO_3$), barium carbonate ($BaCO_3$), and/or strontium carbonate ($SrCO_3$), alkaline earth metal oxides, calcium oxide (CaO), barium oxide (BaO), strontium oxide (SrO), absorbent, portions thereof, combinations thereof, and/or the like.

In some embodiments, the weight fraction of the specific chemical species (e.g., reagent and/or VFA) implemented in the cold-cap 227 relative to the expected weight of produced volatile technetium material may vary from 18% to 149% depending on the selected chemical species (e.g., reagent and/or VFA) material.

Example 6—Managing Volatile Cadmium

In some embodiments, cold-cap 227 may comprise one or more predetermined chemical species (reagent(s)/VFA(s)) configured to manage, treat, fix, and/or contain volatile cadmium, such that managed, treated, fixed, and/or contained formerly volatile cadmium is retained substantially (mostly) within and/or on cold-cap 227. Note, at least some volatile cadmium may be radioactive.

In general, hazardous metals like cadmium cannot be destroyed in most waste thermal processes but may be transformed chemically and/or physically to more stable and/or less dangerous forms. There may potential for hazardous metals, such as cadmium, to vaporize and become volatile at high temperatures. The emissions of volatile metals may be managed by the in-situ capture using inorganic reagents and/or absorbents. In some embodiments, volatile hazardous metals, such as, but not limited to, cadmium, may be reactively scavenged by inorganic absorbents or reagents. Cadmium-113 is produced by neutron activation of the stable isotope cadmium-112 and as a fission product. In some embodiments, an absorbent for cadmium volatile compounds may be kaolinite with chemical formula $Al_2Si_2O_5(OH)_4$.

The following chemical reaction equations (28) and (29) may illustrate the reactions involved in cadmium management interactions with the VFA reagents.

$$CdO+Al_2Si_2O_5(OH)_4 \rightarrow CdOAl_2O_3.2SiO_2+2H_2O \quad \text{(Eq. 28)}$$

$$2CdO+2Al_2Si_2O_5(OH)_4 \rightarrow 2CdOAl_2O_3.2SiO_2+4H_2O \quad \text{(Eq. 29)}$$

In some embodiments, the chemical species (e.g., reagent and/or VFA) of cold-cap 227 for managing, treating, fixing, and/or containing volatile cadmium may be one or more of: aluminosilicates, kaolinite with chemical formula $Al_2Si_2O_5(OH)_4$, absorbent, portions thereof, combinations thereof, and/or the like.

In some embodiments, the weight fraction of the specific chemical species (e.g., reagent and/or VFA) implemented in the cold-cap 227 relative to the expected weight of produced volatile cadmium material may vary from 200% to 202% depending on the selected chemical species (e.g., reagent and/or VFA) material.

Example 7—Managing Volatile Molybdenum

In some embodiments, cold-cap 227 may comprise one or more predetermined chemical species (reagent(s)/VFA(s)) configured to manage, treat, fix, and/or contain volatile molybdenum, such that managed, treated, fixed, and/or contained formerly volatile molybdenum is retained substantially (mostly) within and/or on cold-cap 227. Note, at least some volatile molybdenum may be radioactive.

Most of the dangerous $^{99}$Mo produced from the nuclear waste operations may be treated with the appropriate reagents/absorbers. Among different reagents and/or absorbers, sodium carbonate may be effective in this capacity; and the reaction may occur at temperatures of from 600 to 800 degrees Celsius (° C.). The following chemical equations may illustrate the chemical reactions involved in molybdenum management interactions with the VFA reagents.

$$MoO_3+Na_2CO_3 \rightarrow Na_2MoO_4+CO_2 \quad \text{(Eq. 30)}$$

$$MoO_3+SnO_2 \rightarrow MoO_3:SnO_2(\text{thin film}) \quad \text{(Eq. 31)}$$

In some embodiments, the trapping of molybdenum may be done by a calcium based material absorber (e.g., an absorber with calcium oxide [CaO]) that results in a trapped $CaMoO_4$ phase.

$$MoO_3+CaO \rightarrow CaMoO_4(\text{calcium absorber}) \quad \text{(Eq. 32)}$$

In some embodiments, the trapping of molybdenum may be done by an aluminosilicate absorbent (e.g., $Al_2O_3.4SiO_2$) that results in trapped molybdenum.

$$2MoO_3+2Al_2O_3.4SiO_2 \rightarrow 2MoAlSi_2O_6 \quad \text{(Eq. 33)}$$

In some embodiments, the chemical species (e.g., reagent and/or VFA) of cold-cap 227 for managing, treating, fixing, and/or containing volatile molybdenum may be one or more of: sodium carbonate (e.g., $Na_2CO_3$), calcium based material absorber (e.g., an absorber with calcium oxide [CaO]), aluminosilicates (e.g., alumino-silicate absorbent such as $Al_2O_3.4SiO_2$), tin oxide, absorbent, portions thereof, combinations thereof, and/or the like.

In some embodiments, the weight fraction of the specific chemical species (e.g., reagent and/or VFA) implemented in the cold-cap 227 relative to the expected weight of produced volatile molybdenum material may vary from 39% to 158% depending on the selected chemical species (e.g., reagent and/or VFA) material.

Example 8—Managing Volatile Antimony

In some embodiments, cold-cap 227 may comprise one or more predetermined chemical species (reagent(s)/VFA(s)) configured to manage, treat, fix, and/or contain volatile antimony, such that managed, treated, fixed, and/or contained formerly volatile antimony is retained substantially (mostly) within and/or on cold-cap 227. Note, at least some volatile antimony may be radioactive.

Antimony volatiles like stibine (e.g., $SbH_3$) have been shown to be transported though several gas absorbers and HEPA filters in the PUREX operations and it may suggest that stibine (e.g., $SbH_3$) is a volatile 235 of concern, and the methylated and ethylated antimony volatiles might behave similarly and thus also be volatiles 235 of concern. The following chemical reaction equations may illustrate various chemical species (reagents and/or VFAs) for immobilizing, trapping, and/or managing volatile antimony compounds produced by the vitrification processes.

$$2SbH_3+6Ag \rightarrow 2Ag_3Sb+3H_2 \quad \text{(Eq. 34)}$$

$$SbH_3+3AgCl \rightarrow Sb+3Ag+3HCl \quad \text{(Eq. 35)}$$

$$SbH_3+3AgI \rightarrow Sb+3Ag+3HI \quad \text{(Eq. 36)}$$

$$2(CH_3)_3Sb+O_2 \rightarrow 2(CH_3)_3SbO \quad \text{(Eq. 37)}$$

$$2SbH_3+3O_2 \rightarrow Sb_2O_3+3H_2O \quad \text{(Eq. 38)}$$

$Sb_2O_3$ and $Sb_2O_5$ are both volatile compounds at higher temperatures and may be formed from the oxidation of stibine ($SbH_3$). The volatilizing species $Sb_2O_5$ readily condenses to a particulate at lower temperatures and may be easily trapped.

In some embodiments, volatile antimony compounds (e.g., oxides) may be trapped by using calcium based absorbents (such as, calcium oxide [CaO]) which form the products $CaSb_2O_6$ and $CaSb_2O_7$.

$$Sb_2O_5+CaO \rightarrow CaSb_2O_6 \text{ (calcium material absorber)} \quad \text{(Eq. 39)}$$

$$Sb_2O_5+CaO \rightarrow CaSb_2O_7 \quad \text{(Eq. 40)}$$

In some embodiments, the chemical species (e.g., reagent and/or VFA) of cold-cap 227 for managing, treating, fixing, and/or containing volatile antimony may be one or more of: silver, silver compounds (e.g., silver chloride [AgCl] and silver iodide [AgI]), oxygen, calcium based absorbents (such as, calcium oxide [CaO]), absorbent, portions thereof, combinations thereof, and/or the like.

In some embodiments, the weight fraction of the specific chemical species (e.g., reagent and/or VFA) implemented in the cold-cap 227 relative to the expected weight of produced volatile antimony material may vary from 10% to 568% depending on the selected chemical species (e.g., reagent and/or VFA) material.

Example 9—Managing Volatile Selenium and/or Tellurium

In some embodiments, cold-cap 227 may comprise one or more predetermined chemical species (reagent(s)/VFA(s)) configured to manage, treat, fix, and/or contain volatile selenium and/or tellurium, such that managed, treated, fixed, and/or contained formerly volatile selenium and/or tellurium is retained substantially (mostly) within and/or on cold-cap 227. Note, at least some volatile selenium and/or tellurium may be radioactive.

In the nuclear waste operations, selenium (Se) and tellurium (Te) may form volatiles hydrides (e.g., $H_2Se$ and $H_2Te$) and/or volatile dimethyl (e.g., $Se(CH_3)_2$) compounds. Additionally, volatile diethyl compounds (e.g., $Se(C_2H_5)_2$ and/or $Te(C_2H_5)_2$) may be formed (and appear to be thermodynamically stable). The following chemical reaction equations may illustrate various chemical species (reagents and/or VFAs) for immobilizing, trapping, and/or managing volatile selenium and/or tellurium compounds produced by the vitrification processes and/or produced from outgassing (e.g., from nuclear waste operations).

$$H_2Se+2Ag \rightarrow Ag_2Se+H_2 \qquad (Eq.\ 41)$$

$$H_2Se+2Ag(OH) \rightarrow 2H_2O+Ag_2Se \qquad (Eq.\ 42)$$

$$H_2Te+2Ag \rightarrow Ag_2Te+H_2 \qquad (Eq.\ 43)$$

$$H_2Te+2AgOH \rightarrow Ag_2Te+2H_2O \qquad (Eq.\ 44)$$

Calcium based materials (e.g., calcium oxide [CaO]) may successfully trap volatile selenium and/or tellurium compounds from nuclear waste gas streams. The trapping efficiency of tellurium compounds by using calcium based materials is very high. Published experimental research by the (KAERI) Korean Atomic Energy Research Institute (TR-3884/2009) in 2009 indicates that trapping efficiency of tellurium compounds by calcium based materials may be as high as 99%. Chemical analysis may show that volatile selenium and/or tellurium compounds trapped by calcium-based media may be $Ca_2Te_3O_8$, $CaTeO_3$, $Ca_2Se_3O_8$, and/or $CaTeO_3$.

$$2CaO+3TeO_2 \rightarrow Ca_2Te_3O_8 \qquad (Eq.\ 45)$$

$$CaO+TeO_2 \rightarrow CaTeO_3 \qquad (Eq.\ 46)$$

$$2CaO+3SeO_2 \rightarrow Ca_2Se_3O_8 \qquad (Eq.\ 47)$$

$$CaO+SeO_2 \rightarrow CaSeO_3 \qquad (Eq.\ 48)$$

In some embodiments, the chemical species (e.g., reagent and/or VFA) of cold-cap 227 for managing, treating, fixing, and/or containing volatile selenium and/or volatile tellurium may be one or more of: silver, silver hydroxide (AgOH), silver compounds, calcium based materials (e.g., calcium oxide [CaO]), absorbent, portions thereof, combinations thereof, and/or the like.

In some embodiments, the weight fraction of the specific chemical species (e.g., reagent and/or VFA) implemented in the cold-cap 227 relative to the expected weight of produced volatile selenium material may vary from 34% to 311% depending on the selected chemical species (e.g., reagent and/or VFA) material. In some embodiments, the weight fraction of the specific chemical species (e.g., reagent and/or VFA) implemented in the cold-cap 227 relative to the expected weight of produced volatile tellurium material may vary from 23% to 193% depending on the selected chemical species (e.g., reagent and/or VFA) material.

Example 10—Managing Volatile Rhenium

In some embodiments, cold-cap 227 may comprise one or more predetermined chemical species (reagent(s)/VFA(s)) configured to manage, treat, fix, and/or contain volatile rhenium, such that managed, treated, fixed, and/or contained formerly volatile rhenium is retained substantially (mostly) within and/or on cold-cap 227. Note, at least some volatile rhenium may be radioactive.

The following chemical reaction equations may illustrate various chemical species (reagents and/or VFAs) for immobilizing, trapping, and/or managing volatile rhenium compounds produced by the vitrification processes and/or produced from outgassing (e.g., from nuclear waste operations).

$$CaO+Re_2O_7 \rightarrow Ca(ReO_4)_2 \qquad (Eq.\ 49)$$

$$CaCO_3+ReO_3 \rightarrow CaReO_3+CO_2 \text{ (a perovskite like structure)} \qquad (Eq.\ 50)$$

Per either or both of the above two chemical reactions, the fixation or trapping of volatile rhenium compounds may be implemented by calcium based absorber materials (e.g., calcium oxide [CaO] and/or calcium carbonate [$CaCO_3$]). The trapping mechanism is very efficient at more than 90% efficiency. The resultant product may be $Ca(ReO_4)_4$ when calcium oxide is used as the VFA.

Volatile rhenium may be captured by aluminum silicate compounds.

$$Re_2O_7+Al_2O_3 \rightarrow SiO_2 \rightarrow Re_2O_7/SiO_2 - Al_2O_3 \qquad (Eq.\ 51)$$

In some embodiments, the chemical species (e.g., reagent and/or VFA) of cold-cap 227 for managing, treating, fixing, and/or containing volatile rhenium may be one or more of: calcium oxide (e.g., CaO), calcium carbonate (e.g., $CaCO_3$), calcium compounds, aluminum silicate compounds (e.g., $Al_2O_3.SiO_2$), absorbent, portions thereof, combinations thereof, and/or the like.

In some embodiments, the weight fraction of the specific chemical species (e.g., reagent and/or VFA) implemented in the cold-cap 227 relative to the expected weight of produced volatile rhenium material may vary from 12% to 33% depending on the selected chemical species (e.g., reagent and/or VFA) material.

Example 11—Managing Volatile Ruthenium

In some embodiments, cold-cap 227 may comprise one or more predetermined chemical species (reagent(s)/VFA(s)) configured to manage, treat, fix, and/or contain volatile ruthenium, such that managed, treated, fixed, and/or contained formerly volatile ruthenium is retained substantially (mostly) within and/or on cold-cap 227. Note, at least some volatile ruthenium may be radioactive (e.g., $^{106}Ru$).

Ruthenium-106 ($^{106}Ru$) is a source of radioactivity among the gaseous effluents from nuclear operations. Additional problems may be associated with the volatility of ruthenium-106 are generation of substantial heat and radiation produced by ruthenium-106 decay, which rapidly decays to palladium-106 ($^{106}Pd$). A certain amount of ruthenium-106 may be included in spent nuclear fuel as a fission product and may generally exist in the form of metallic precipitates and is easily oxidized to $RuO_2$ when heated under certain conditions. However, when $RuO_2$ is exposed to high temperature and an oxidative condition during separation trapping processes, it is oxidized and volatilized to gaseous $RuO_4$, whose boiling point is 25.4 degrees Celsius (° C.).

Several VFA fixation materials to treat and fix/immobilize gaseous ruthenium oxides arising from the related nuclear operations may be shown in Table 5, along with their respective chemical reactions.

The chemical fixation method of volatile ruthenium compounds may use alkaline earth metal carbonates (e.g., $CaCO_3$, $BaCO_3$, and/or $SrCO_3$) and/or alkaline earth metal oxides (e.g., CaO, BaO, and/or SrO) as the VFA. For each alkaline earth metal carbonates such as $CaCO_3$, $BaCO_3$ and/or Sr, the minimum reaction temperatures may be 495, 425, and 515 degrees Celsius (° C.), respectively.

Other volatile ruthenium fixation VFAs may include ferric oxide ($Fe_2O_3$, iron(III) oxide), yttrium oxide ($Y_2O_3$), $Li_2O$, and/or titanium dioxide ($TiO_2$). Yttrium oxide ($Y_2O_3$) may be formed into a pyrochlore structure of $Y_2Ru_2O_7$ by its reaction with ruthenium oxide, which is thermally stable up to 1,400 degrees Celsius (° C.) and has a large theoretical capacity of trapping per unit mass (0.89 g/g). The comparison of stoichiometric capacities of trapping materials is shown in Table 6.

The following Table 5 shows the expected reactions of metal ruthenates with various VFAs.

The following Table 6 compares the stoichiometric capacities of a plurality of trapping VFA materials utilized for ruthenium trapping or fixation and the chemical products.

TABLE 6

Comparison of stoichiometric capacities of trapping materials.

| VFA | Reaction Product | Trapping capacity (g-Ru/g-material) |
|---|---|---|
| CaO | $CaRuO_3$ | 1.82 |
| $CaCO_3$ | $CaRuO_3$ | 1.01 |
| $SrCO_3$ | $SrRuO_3$ | 0.68 |
| $BaCO_3$ | $BaRuO_3$ | 0.51 |
| $Li_2O$ | $Li_2RuO_3$ | 4.41 |
| $Y_2O_3$ | $Y_2Ru_2O_7$ | 0.89 |
| $Nd_2O_3$ | $Nd_2Ru_2O_7$ | 0.20 |

See also FIG. 22 for Table 6.

The following Table 7 compares a plurality of trapping methods and their advantages or disadvantages for volatile ruthenium trapping or fixation.

TABLE 7

Comparison of trapping methods for ruthenium.

| Adsorbent | Advantages | Disadvantages | Remarks |
|---|---|---|---|
| Silica gel | effective sorbent at low temperature (about 80° C.): removal efficiency of about 99.8% regeneration available | temperature limit: under 100° C. over 100° C.: decrease of DF values (loss of thermal stability) | generally silica gel includes impurities (Fe, Co, Ni, Cr, etc.) |
| Metal oxide ($Fe_2O_3$, $TiO_2$, $MnO_2$ etc.) | 500~550° C.: 99.5% good trapping capacity and good resistance against impurities good trapping stability | over 600° C.: ruthenium desorption $Fe_2O_3$ powder difficulty in fabrication process | |
| Yttria ($Y_2O_3$) | below 1400° C.: good thermal stability | higher operation temperature (900° C.) | $Y_2Ru_2O_7$ formation (pyrochlore) |
| Complex metal [oxide alkaline earth metal (Ba—$CO_3$) + metal oxide] | high efficiency: $BaCO_3$—$Fe_2O_3$ at 450~750° C., 95~96% $BaCO_3$—$TiO_2$ at 650° C., 95% $BaCO_3$—$MnO_2$ at 550~750° C., 94% high efficiency for a long time: for 60 hours in [$BaCO_3$—$Fe_2O_3$] | not available solidification over 1500° C. (loss of thermal stability and generation of $CO_2$) | need to develop adsorbent including higher thermal stability, stability of filter trapped and high efficiency for a long time over 1500° C. |

See also FIG. 23 for Table 7.

In some embodiments, the chemical species (e.g., reagent and/or VFA) of cold-cap 227 for managing, treating, fixing, and/or containing volatile ruthenium may be one or more of: alkaline earth metal carbonates (e.g., calcium carbonate [$CaCO_3$], barium carbonate [$BaCO_3$], and/or strontium carbonate [$SrCO_3$]), alkaline earth metal oxides (e.g., calcium oxide [CaO], barium oxide [BaO], and/or strontium carbonate [SrO]), ferric oxide ($Fe_2O_3$, iron(III) oxide), yttrium oxide ($Y_2O_3$), $Li_2O$, titanium dioxide ($TiO_2$), absorbent, portions thereof, combinations thereof, and/or the like.

In some embodiments, the weight fraction of the specific chemical species (e.g., reagent and/or VFA) implemented in the cold-cap 227 relative to the expected weight of produced volatile ruthenium material may be calculated based on the

TABLE 5

Expected chemical reactions of metal ruthenate.

| Structure | VFA | Expected Chemical Reaction |
|---|---|---|
| Perovskites ($MRuO_3$) | $BaCO_3$ | $BaCO_3 + RuO_2 \rightarrow BaRuO_3 + CO_2(g)$ |
| | $CaCO_3$ | $CaCO_3 + RuO_2 \rightarrow CaRuO_3 + CO_2(g)$ |
| | $SrCO_3$ | $SrCO_3 + RuO_2 \rightarrow SrRuO_3 + CO_2(g)$ |
| Pyrochleres ($M_2Ru_2O_7$) | $Y_2O_3$ | $Y_2O_3 + 2RuO_2 \rightarrow Y_2Ru_2O_7$ |
| | $Nd_2O_3$ | $Nd_2O_3 + 2RuO_2 \rightarrow Nd_2Ru_2O_7$ |
| Hollandite ($MRu_4O_8$) | $K_2O$ | $K_2O + 8RuO_2 \rightarrow 2KRu_4O_8 + 1/2O_2(g)$ |
| | $Rb_2O$ | $Rb_2O + 8RuO_2 \rightarrow 2RbRu_4O_8 + 1/2O_2(g)$ |
| | $Na_2O_2$ | $Na_2O_2 + 4RuO_2 \rightarrow 2NaRu_2O_4 + O_2(g)$ |
| | $Li_2O$ | $Li_2O + RuO_2 \rightarrow Li_2RuO_3$ |

See also FIG. 21 for Table 5.

trapping capacity (see e.g., Table 6) of the chemical species (e.g., reagent and/or VFA) absorbent which may vary from 0.20 to 1.82 g/g depending on the selected reagent material.

Example 12—Managing Volatile Rhodium

In some embodiments, cold-cap 227 may comprise one or more predetermined chemical species (reagent(s)/VFA(s)) configured to manage, treat, fix, and/or contain volatile rhodium, such that managed, treated, fixed, and/or contained formerly volatile rhodium is retained substantially (mostly) within and/or on cold-cap 227. Note, at least some volatile rhodium may be radioactive.

Rhodium produced in nuclear operations has one unusual property which permits the separation thereof from at least mostly all other constituents; i.e., the volatility-of rhodium tetroxide ($RhO_4$). Nuclear product waste streams may be treated in such a manner as to separate out the rhodium tetroxide. The rhodium tetroxide may then be reduced to rhodium hydrated oxide or metallic rhodium. The following chemical reaction equations may illustrate various chemical species (reagents and/or VFAs) for immobilizing, trapping, and/or managing volatile rhodium compounds produced by the vitrification processes and/or produced from outgassing (e.g., from nuclear waste operations).

$$RhO_4 + 4H_2 \rightarrow Rh(s) + 4H_2O \quad \text{(Eq. 52)}$$

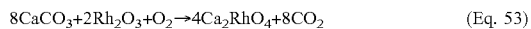

$$8CaCO_3 + 2Rh_2O_3 + O_2 \rightarrow 4Ca_2RhO_4 + 8CO_2 \quad \text{(Eq. 53)}$$

In some embodiments, porous borosilicate may be used to capture rhodium tetroxide ($RhO_4$) through the reaction below (equation (54).

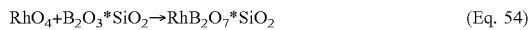

$$RhO_4 + B_2O_3{*}SiO_2 \rightarrow RhB_2O_7{*}SiO_2 \quad \text{(Eq. 54)}$$

In some embodiments, the chemical species (e.g., reagent and/or VFA) of cold-cap 227 for managing, treating, fixing, and/or containing volatile rhodium may be one or more of: calcium carbonate (e.g., $CaCO_3$), borosilicates (e.g., porous and/or $B_2O_3{*}SiO_2$), hydrogen, absorbent, portions thereof, combinations thereof, and/or the like.

In some embodiments, the weight fraction of the specific chemical species (e.g., reagent and/or VFA) implemented in the cold-cap 227 relative to the expected weight of produced volatile rhodium material may vary from 5% to 134% depending on the selected chemical species (e.g., reagent and/or VFA) material.

In some embodiments, volatile(s) 235 may be a volatile form of: iodine, cesium, carbon, tritium, technetium, cadmium, molybdenum, selenium, tellurium, rhenium, ruthenium, rhodium, portions thereof, isotopes thereof, radioactive isotopes thereof, compounds thereof, molecules thereof, derivatives thereof, combinations thereof, and/or the like.

In some embodiments, the chemical species (e.g., reagent and/or VFA) of cold-cap 227 for managing, treating, fixing, and/or containing at least one of the volatile(s) 235 may be one or more of: silver; silver nitrate (e.g., $AgNO_3$); a silver compound from Table 1; a silver compound from Table 2; a silver containing absorbent; silver compounds; silver chloride (AgCl); silver iodide (AgI); silver hydroxide (AgOH); an absorbent with silver from a silver ion zeolite exchange system; a silver compound made from using silver ion exchange on a support matrix of faujasite and mordenite; a silica gel matrix impregnated with silver nitrate; metakaolin ($Al_2O_3.2SiO_2$); bentonite ($Al_2O_3.4SiO_2.6H_2O$); pyrophyllite ($Al_2O_3.4SiO_2.H_2O$); clay; Fly Ash; caustic powders; caustic pellets; caustic aqueous solution; alkali metal hydroxides; sodium hydroxide; ascarite (NaOH on asbestos); $LiOH.H_2O$; alkali metal carbonates; sodium carbonate (e.g., $Na_2CO_3$); alkali metal oxides; lithium oxide ($Li_2O$); alkaline earth metal hydroxides; calcium hydroxide ($Ca(OH)_2$); barium hydroxide ($Ba(OH)_2$); alkaline earth metal oxides; calcium oxide (CaO); barium oxide (BaO); strontium oxide (SrO); alkaline earth metal carbonates; calcium carbonate ($CaCO_3$); barium carbonate ($BaCO_3$); strontium carbonate ($SrCO_3$); calcium-based absorbents (e.g., an absorber with calcium oxide [CaO]); magnesium; magnesium-based absorbents; soda lime (NaOH—$Ca(OH)_2$ mixtures); baralyme ($Ca(OH)_2$—$Ba(OH)_2$ mixtures); sodium zeolite absorber; natural mordenite; hydrogenated mordenite; modified hydrogenated mordenite; hydrogen containing manganese oxide(s) having a spinel crystal structure; hydrogen-containing manganese oxide ($H_xMn_2O_4$) having a spinel crystal structure; lithium containing manganese oxide(s) having a spinel crystal structure; lithium-containing manganese oxide ($Li_xMn_2O_4$) having a spinel crystal structure; aluminosilicates; kaolinite with chemical formula $Al_2Si_2O_5(OH)_4$; alumino-silicate absorbent such as $Al_2O_3.4SiO_2$; aluminum silicate compounds (e.g., $Al_2O_3.SiO_2$); tin oxide; ferric oxide ($Fe_2O_3$, iron(III) oxide); yttrium oxide ($Y_2O_3$); titanium dioxide ($TiO_2$); borosilicates (e.g., porous and/or $B_2O_3{*}SiO_2$); oxygen; hydrogen; absorbents thereof, portions thereof, combinations thereof, and/or the like.

In some embodiments, such chemical species (e.g., reagent and/or VFA) of cold-cap 227 in and/or on the cold-cap 227 may be in the form of and/or part of one or more of: gas, liquid, solids, gels, aerogels, slurries, foams, pellets, powders, granules, beads, spheres, glasses, ceramics, clays, hollow cylinders, structures made from resin(s), layers, laminates, media commonly used to house catalysts, portions thereof, combinations thereof, and/or the like.

In some embodiments, at least some of the chemical species (e.g., reagent and/or VFA) of cold-cap 227 may reside within container(s) within and/or placed in the cold-cap 227 region. In some embodiments, such container(s) may be perforated with the perforations being configured for gas movement. In some embodiments, such container(s) may be perforated mesh bag(s) with the perforations being configured for gas movement.

Various products, devices, apparatus, systems, mechanisms, means, methods, and/or processes have been described that relate to the management of volatiles produced from vitrification of nuclear wastes and/or of volatiles from nuclear operations. The foregoing description of the various embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:
1. A method for managing at least one volatile chemical produced from nuclear operations and/or produced from vitrification of waste within a vitrification chamber, the method comprising steps of:
   (a) filling the vitrification chamber with a predetermined quantity of radioactive waste;

(b) installing at least a portion of a heater system to the vitrification chamber, wherein the heater system is configured to vitrify the predetermined quantity of the radioactive waste within the vitrification chamber;

(c) energizing the heating system to heat the predetermined quantity of the radioactive waste within the vitrification chamber;

(d) initiating a cold-cap vertically above the predetermined quantity of radioactive waste that is within the vitrification chamber; wherein vertical in this context is substantially parallel with a direction of pull of a gravitational field at the vitrification chamber; wherein the cold-cap thermally insulates a closest portion vertically above the cold-cap from portions of the vitrification chamber below the cold-cap;

(e) adding at least one predetermined volatile-fixing-additive to the cold-cap, wherein the at least one predetermined volatile-fixing-additive is configured to convert most of the at least one volatile chemical into at least one fixed-chemical; wherein the at least one fixed-chemical is retained in the cold-cap; and (f) vitrifying the predetermined quantity of the radioactive waste within the vitrification chamber using the heater system resulting in a glass-waste-product and resulting in at least some of the at least one volatile chemical.

2. The method according to claim 1, wherein the at least one volatile chemical is a volatile chemical that comprises at least one element or isotope of the following chemical species: iodine.

3. The method according to claim 1, wherein the at least one volatile chemical is radioactive.

4. The method according to claim 1, wherein the vitrification chamber is at least one human-made cavern.

5. The method according to claim 4, wherein the at least one human-made cavern is located within a deep geologic rock formation; wherein the deep geologic rock formation is at least 2,000 feet below a terrestrial surface of the Earth.

6. The method according to claim 1, wherein the cold-cap is located within the vitrification chamber.

7. The method according to claim 1, wherein the method prior to the steps (a) through (f) first comprises a step of analyzing the radioactive waste to be filled in the step (a) to determine identification of the at least one volatile chemical.

8. The method according to claim 7, wherein the analyzing of the radioactive waste and the identification determination of the at least one volatile chemical utilizes one or more of the following techniques: chemical reaction simulation software running on a computer, empirical analysis, and/or chemical analysis of a sample of the radioactive waste and resulting products from a small-scale laboratory vitrification batch test run.

9. The method according to claim 7, wherein after the identification of the at least one volatile chemical, the method further comprises a step of determining and identifying the at least one predetermined volatile-fixing-additive.

10. The method according to claim 1, the at least one volatile-fixing-additive is selected from one or more of the following chemical species: silver; silver nitrate ($AgNO_3$); an absorbent with silver; silver compounds; silver chloride (AgCl); silver iodide (AgI); silver hydroxide (AgOH); an absorbent with silver from a silver ion zeolite exchange system; a silver compound made from using silver ion exchange on a support matrix of faujasite and mordenite; a silica gel matrix impregnated with silver nitrate.

11. The method according to claim 1, wherein when the at least one volatile chemical comprises iodine, then the at least one predetermined volatile-fixing-additive is selected from one or more of the following chemical species: silver, silver nitrate, an absorbent with silver from a silver ion zeolite exchange system, a silver compound made from using silver ion exchange on a support matrix of faujasite and mordenite, or a silica gel matrix impregnated with silver nitrate.

12. The method according to claim 1, wherein when the at least one volatile chemical comprises cesium, then the at least one predetermined volatile-fixing-additive is selected from one or more of the following chemical species: metakaolin, bentonite, or pyrophyllite.

13. The method according to claim 1, wherein when the at least one volatile chemical comprises carbon-14, then the at least one predetermined volatile-fixing-additive is selected from one or more of the following chemical species: sodium hydroxide, calcium hydroxide, barium hydroxide, magnesium, an alkali metal hydroxide, an alkaline earth hydroxide, ascarite, $LiOH.H_2O$, soda lime, baralyme, sodium zeolite, natural mordenite, hydrogenated mordenite, or modified hydrogenated mordenite.

14. The method according to claim 1, wherein when the at least one volatile chemical comprises tritium, then the at least one predetermined volatile-fixing-additive is selected from one or more of the following chemical species: hydrogen comprising manganese oxide having a spinel crystal structure, hydrogen-containing manganese oxide of formula, $H_xMn_2O_4$, having a spinel crystal structure, lithium containing manganese oxide having a spinel crystal structure, or lithium-containing manganese oxide of formula, $Li_xMn_2O_4$, having a spinel crystal structure.

15. The method according to claim 1, wherein when the at least one volatile chemical comprises technetium, then the at least one predetermined volatile-fixing-additive is selected from one or more of the following chemical species: an alkaline earth metal carbonate, calcium carbonate, barium carbonate, strontium carbonate, an alkaline earth metal oxide, calcium oxide, barium oxide, or strontium oxide.

16. The method according to claim 1, wherein when the at least one volatile chemical comprises cadmium, then the at least one predetermined volatile-fixing-additive is an aluminosilicate kaolinite with a chemical formula of $Al_2Si_2O_5(OH)_4$.

17. The method according to claim 1, wherein when the at least one volatile chemical comprises molybdenum, then the at least one predetermined volatile-fixing-additive is selected from one or more of the following chemical species: sodium carbonate, calcium oxide, an aluminosilicate, or tin oxide.

18. The method according to claim 1, wherein when the at least one volatile chemical comprises antimony, then the at least one predetermined volatile-fixing-additive is selected from one or more of the following chemical species: silver, silver chloride, silver iodide, or calcium oxide.

19. The method according to claim 1, wherein when the at least one volatile chemical comprises selenium and/or tellurium, then the at least one predetermined volatile-fixing-additive is selected from one or more of the following chemical species: silver, silver hydroxide, or calcium oxide.

20. The method according to claim 1, wherein when the at least one volatile chemical comprises rhenium, then the at least one predetermined volatile-fixing-additive is selected from one or more of the following chemical species: calcium oxide, calcium carbonate, an aluminum silicate compound.

21. The method according to claim 1, wherein when the at least one volatile chemical comprises ruthenium, then the at least one predetermined volatile-fixing-additive is selected from one or more of the following chemical species: an alkaline earth metal carbonate, calcium carbonate, barium carbonate, strontium carbonate, an alkaline earth metal oxide, calcium oxide, barium oxide, strontium carbonate, ferric oxide, yttium oxide ($Y_2O_3$), lithium oxide ($Li_2O$), or titanium dioxide.

22. The method according to claim 1, wherein when the at least one volatile chemical comprises rhodium, then the at least one predetermined volatile-fixing-additive is selected from one or more of the following chemical species: calcium carbonate or a borosilicate.

23. The method according to claim 1, wherein the step (e) occurs before or during the step (f).

* * * * *